United States Patent
Garai et al.

(10) Patent No.: US 10,242,579 B2
(45) Date of Patent: Mar. 26, 2019

(54) SYSTEMS AND METHODS FOR SITUATIONAL AWARENESS OF CURRENT AND FUTURE VEHICLE STATE

(71) Applicant: HONEYWELL INTERNATIONAL INC., Morris Plains, NJ (US)

(72) Inventors: Tanushree Maiti Garai, Karnataka (IN); Kiran Mancheiah Venkataramana, Karnataka (IN); Mohan Gowda Chandrashekarappa, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/180,928

(22) Filed: Jun. 13, 2016

(65) Prior Publication Data

US 2017/0358219 A1 Dec. 14, 2017

(51) Int. Cl.
*G08G 5/00* (2006.01)
*B64D 43/02* (2006.01)
*G01C 23/00* (2006.01)

(52) U.S. Cl.
CPC ........... *G08G 5/0047* (2013.01); *B64D 43/02* (2013.01); *G01C 23/005* (2013.01); *G08G 5/003* (2013.01);
(Continued)

(58) Field of Classification Search
None
See application file for complete search history.

(56) References Cited

U.S. PATENT DOCUMENTS 6,085,129 A 7/2000 Schardt et al.
6,870,490 B2 3/2005 Sherry et al.
(Continued)

FOREIGN PATENT DOCUMENTS

EP 2009612 A2 12/2008
EP 2568256 A2 3/2013
(Continued)

OTHER PUBLICATIONS

Shish, Kimberlee, et al., "Trajectory Prediction and Alerting for Aircraft Mode and Energy State Awareness," American Institute of Aeronautics and Astronautics, 2014, p. 1-19.
(Continued)

*Primary Examiner* — Tamara L Weber
(74) *Attorney, Agent, or Firm* — Lorenz & Kopf, LLP

(57) ABSTRACT

A system and method for displaying a current state and a future state of a vehicle on a display associated with the vehicle are provided. The method includes: receiving flight plan data for a selected flight plan and a plurality of legs associated with the selected flight plan from a source of flight plan data; determining, with a processor, a current state of the vehicle with respect to one of the plurality of legs based on sensor data; determining, with the processor, a current target state for the vehicle with respect to one of the plurality of legs based on the flight plan data; determining a divergence of the current state based on a difference between the current state and the current target state; and generating a user interface for display that illustrates the divergence of the current state with respect to the one of the plurality of legs.

13 Claims, 10 Drawing Sheets

(52) U.S. Cl.
CPC ......... *G08G 5/0021* (2013.01); *G08G 5/0052* (2013.01)

(56) References Cited

U.S. PATENT DOCUMENTS

| | | | |
|---|---|---|---|
| 7,783,393 B2 | 8/2010 | Tucker et al. | |
| 8,027,783 B2 | 9/2011 | Closse et al. | |
| 8,412,392 B2 | 4/2013 | Jayathirtha et al. | |
| 8,532,849 B1* | 9/2013 | Tsai ................. | G01C 23/00 340/979 |
| 9,224,302 B1* | 12/2015 | Young ............... | G08G 5/0039 |
| 2005/0192717 A1* | 9/2005 | Tafs ................. | G07C 5/085 701/3 |
| 2013/0013133 A1* | 1/2013 | Walter ............... | G08G 5/0021 701/11 |
| 2014/0343765 A1* | 11/2014 | Suiter ............... | G08G 5/0056 701/18 |
| 2016/0027312 A1* | 1/2016 | Kneuper ............. | G08G 5/0008 701/120 |

FOREIGN PATENT DOCUMENTS

| | | | |
|---|---|---|---|
| EP | 2779140 A1 | 9/2014 | |
| EP | 2837914 A1 | 2/2015 | |
| EP | 2924530 A1 | 9/2015 | |
| FR | 2834057 A1 | 6/2003 | |

OTHER PUBLICATIONS

Extended EP Search Report for Application No. 17174867.6-1803 dated Oct. 27, 2017.

\* cited by examiner

SYSTEMS AND METHODS FOR SITUATIONAL AWARENESS OF CURRENT AND FUTURE VEHICLE STATE

TECHNICAL FIELD

The present disclosure generally relates to vehicles, such as aircraft, and more particularly relates to systems and methods for providing situational awareness of a current and a future state of a vehicle during an autopilot mode or during a designated optimal trajectory in a non-autopilot mode, by displaying the current and the future state of the vehicle on a display associated with the vehicle.

BACKGROUND

Certain vehicles, such as aircraft, can be operated in an autopilot mode, in which an autopilot system controls various systems of the aircraft to control the path of the aircraft under the supervision of a pilot. In certain instances, the autopilot system may be used to direct the vertical trajectory of the aircraft, such as a vertical descent of the aircraft for landing. Generally, the vertical trajectory of an aircraft is defined as a function of altitude with associated speed constraints along the aircraft lateral distance to the end point of the leg. While controlling the vertical descent of the aircraft, the autopilot system may encounter conditions where the aircraft may deviate from the planned vertical path due to varying wind conditions or incorrect energy management in descent or approach. Given the pilot's generally high workload during descent and approach for landing, the pilot may not be able to easily discern the new path of the aircraft taken by the autopilot system.

Accordingly, it is desirable to provide improved systems and methods for providing situational awareness of the current and the future state of a vehicle, such as an aircraft, during an autopilot mode, by displaying the current and the future state on a display associated with the vehicle to enable the pilot to discern the current and future path of the vehicle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method for displaying a current state and a future state of a vehicle on a display associated with the vehicle. The method includes: receiving flight plan data for a selected flight plan and a plurality of legs associated with the selected flight plan from a source of flight plan data; determining, with a processor, a current state of the vehicle with respect to one of the plurality of legs of the selected flight plan based on sensor data generated by one or more sensors associated with the vehicle; determining, with the processor, a current target state for the vehicle with respect to one of the plurality of legs of the selected flight plan based on the flight plan data; determining a divergence of the current state based on a difference between the current state and the current target state; and generating a user interface for display on the display that illustrates the divergence of the current state with respect to the one of the plurality of legs of the selected flight plan.

Also provided according to various embodiments is a system that displays a current state and a future state of a vehicle on a display associated with the vehicle. The system includes a source of a flight plan data for a selected flight plan and a plurality of legs associated with the selected flight plan. The system also includes a control module having a processor that: determines a current state of the vehicle with respect to one of the plurality of legs of the selected flight plan based on sensor data generated by one or more sensors associated with the vehicle; determines a current target state for the vehicle with respect to one of the plurality of legs of the selected flight plan based on the flight plan data; determines a divergence of the current state based on a difference between the current state and the current target state; determines at least one corrective action based on the determination of the divergence; and generates a user interface for display on the display that illustrates the divergence of the current state with respect to the one of the plurality of legs of the selected flight plan, and outputs a prompt on the user interface for the at least one corrective action.

Further provided according to various embodiments is a method for displaying a current state and a future state of a vehicle on a display associated with the vehicle. The method includes: receiving flight plan data for a selected flight plan and one or more legs associated with the selected flight plan from a source of flight plan data, the one or more legs including a current leg and at least one future leg; determining, with a processor, a current state of the vehicle with respect to the current leg based on sensor data generated by one or more sensors associated with the vehicle; determining, with the processor, a current target state for the vehicle with respect to the current leg based on the flight plan data; determining, with the processor, a future state of the vehicle with respect to the at least one future leg based on the determined current state; determining, with the processor, a future target state for the vehicle with respect to the at least one future leg based on the flight plan data; determining one of a convergence of the current state based on the current state matching the current target state or a divergence of the current state based on a difference between the current state and the current target state; determining one of a convergence of the future state based on the future state matching the future target state or a divergence of the future state based on a difference between the future state and the future target state; and outputting a user interface for display on the display that indicates: the convergence or divergence of the current state; and the convergence or divergence of the future state.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any suitable vehicle, such as rotorcraft, automobiles, marine vessels, etc., and that the following description regarding a fixed-wing aircraft is merely one exemplary embodiment for displaying the current and the future state of a vehicle on a display of the present disclosure. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the display system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
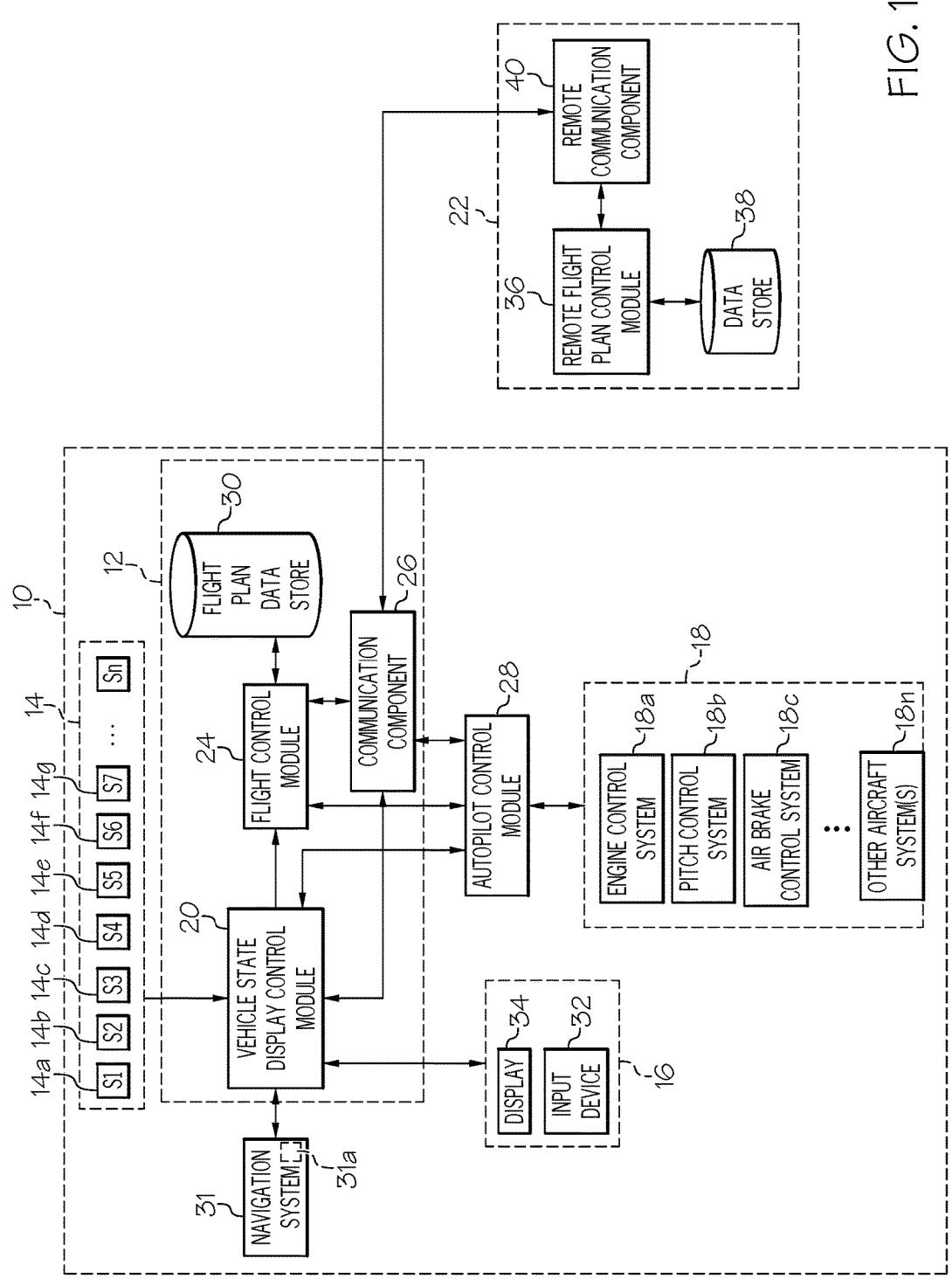
FIG. 1 is a schematic illustration of a system for displaying a current and future vehicle state on a display associated with a vehicle in accordance with various embodiments.

With reference to FIG. 1, a mobile platform or vehicle 10 is shown. In one example, the vehicle 10 comprises a fixed-wing aircraft; however, the vehicle 10 can comprise any vehicle, such as a rotorcraft, etc. In this example, the vehicle 10 includes a flight management system 12, one or more sensors 14, a human-machine interface 16, one or more vehicle systems 18 and a vehicle state display control module 20. The vehicle 10 is also in communication with a remote processing system 22. As will be discussed herein, the vehicle state display control module 20 receives input from the flight management system 12, the one or more sensors 14 and the remote processing system 22, and outputs a current and future state for the vehicle 10 for display on the human-machine interface 16. Although the figures shown herein depict an example with certain arrangements of elements, additional intervening elements, devices, features, or components may be present in an actual embodiment. It should also be understood that FIG. 1 is merely illustrative and may not be drawn to scale. Moreover, while the following discussion refers to the vehicle state display control module 20 in communication with an autopilot system associated with the vehicle 10, it will be understood that the present disclosure is not so limited. In this regard, the vehicle state display control module 20 can be used to represent a desired vertical trajectory and associated revisions or corrections for a safe descent and approach in a non-autopilot mode. As used herein a "current state" of the vehicle 10 refers to a current path, current speed and/or current pitch angle of the vehicle 10 relative to a flight plan for the vehicle 10; a "future state" of the vehicle 10 refers to a future path, future speed and/or future pitch angle of the vehicle 10 relative to the flight plan; a "current target state" of the vehicle 10 refers to a current planned path, current planned speed and/or current planned pitch angle for the vehicle 10 relative to the flight plan for the vehicle 10; and a "future target state" of the vehicle 10 refers to a future planned path, future planned speed and/or future planned pitch angle for the vehicle 10 relative to the flight plan for the vehicle 10.

The flight management system 12 manages a flight plan associated with the vehicle 10 while in-flight. In various embodiments, the flight management system 12 includes a flight control module 24 and a communication component 26. The flight management system 12 is also in communication with an autopilot system, which includes an autopilot control module 28. The flight control module 24, the communication component 26 and the autopilot control module 28 are in communication with the one or more sensors 14, the human-machine interface 16, the vehicle systems 18 and the vehicle state display control module 20 over a suitable communication architecture or arrangement that facilitates the transfer of power, commands, data, etc. The flight control module 24 receives a flight plan or flight plan data associated with the vehicle 10, and manages the flight plan while in-flight. In one example, the flight control module 24 receives the flight plan data from the communication component 26 and stores the flight plan data in a flight plan datastore 30 onboard the vehicle 10. The flight control module 24 can also be responsive to input received via the human-machine interface 16 to modify the flight plan, and based upon the receipt of such input, the flight control module 24 can update the flight plan datastore 30 with the received updated flight plan data. Generally, the flight plan data comprises the planned or target flight path for the vehicle 10, from take-off to landing, which can include a selected flight plan for take-off, a selected flight plan for level or cruising flight, a selected flight plan for approach to landing, and so on. For each of the selected flight plans, the selected flight plan can be broken down into segments or legs. In one example, the approach for the vehicle 10 can have two or more legs, separated by one or more waypoints, which define the approach.

The flight plan datastore 30 stores the information required for managing the flight plan, as is known in the art. The flight plan datastore 30 can be defined in the ARINC 424 standard. The flight plan datastore 30 stores, for example, waypoints/intersections, airways, radio navigations aids, airports, runways, standard instrument departure data, standard terminal arrival data, holding patterns and instrument approach procedures. The flight plan datastore 30 also stores the defined legs of each of the flight plans, along with distance data in nautical miles for the flight plan. The flight plan datastore 30 can also store one or more vertical profiles associated with each of the defined legs of each of the flight plans. Generally, the vertical profile comprises an altitude range, speed, flight path angle, etc. for the vehicle 10 for the particular leg of the flight plan.

The communication component 26 sends and receives data, such as flight plan data for the vehicle 10. In one example, the communication component 26 is a transceiver, and the flight plan data is transmitted via modulated radio frequency (RF) signals. In this example, the communication component 26 demodulates the flight plan data for receipt by the flight control module 24. In addition, the communication component 26 may also receive flight plan data from the flight control module 24, which has been modified by the pilot, and modulates this flight plan data for transmission to the remote processing system 22 (e.g. air traffic control station). It should be noted, however, that any suitable communication method could be employed to enable communication between the vehicle 10 and the remote processing system 22 (e.g. air traffic control station), such as an ACARS digital datalink. Thus, the communication component 26 enables two-way communications between the flight management system 12 onboard the vehicle 10 and the remote processing system 22.

The autopilot control module 28 is responsive to one or more input commands received via the human-machine interface 16 to control one or more of the vehicle systems 18 to maintain the flight plan for the vehicle 10 based on the flight plan data, which is received from the flight control module 24. For example, the autopilot control module 28 is responsive to the input command to generate one or more control signals to the vehicle systems 18 to execute one or more legs of a selected flight plan, for example, a descent or approach to landing, based on the flight plan data stored in the flight plan datastore 30. In one example, the autopilot control module 28 comprises a vertical navigation (VNAV) control module, which controls the vertical movement of the vehicle 10, for example, during an approach to landing flight plan.

In one embodiment, the flight management system 12 also includes a navigation system 31. The navigation system includes at least a global positioning system (GPS) 31a. The global positioning system 31a provides a current global position of the vehicle 10. The global positioning system 31a may include one or more position sensors, such as a GPS receiver, radio aids, such as scanning distance measuring equipment, VHF omnidirectional radio range (VORs), inertial reference systems (IRS). The flight management system 12 may integrate the positions obtained from the one or more position sensors of the global positioning system 31a and determine a single position of the vehicle 10 and a corresponding accuracy of the position. The sensor signals from the one or more position sensors of the global positioning system 31a are communicated, over a communication architecture, such as a bus, to the vehicle state display control module 20.

The one or more sensors 14 observe measurable conditions of the vehicle 10. In one example, the one or more sensors 14 comprise an altitude sensor 14a, a vertical acceleration sensor 14b, a vertical speed sensor 14c, an altitude error rate sensor 14d, a vertical speed error rate sensor 14e, an air speed sensor 14f and an airspeed error rate sensor 14g. The altitude sensor 14a observes an altitude of the vehicle 10, and generates sensor signals based thereon. The vertical acceleration sensor 14b observes a vertical acceleration of the vehicle 10, and generates sensor signals based thereon. The vertical speed sensor 14c observes a vertical speed of the vehicle 10, and generates sensors signals based thereon. The altitude error rate sensor 14d observes an error rate associated with the altitude measured by the altitude sensor 14a and generates sensor signals based thereon. The vertical speed error rate sensor 14e observes an error rate associated with the vertical speed measured by the vertical speed sensor 14c and generates sensor signals based thereon. The air speed sensor 14f observes a speed of the air or wind surrounding the vehicle 10 (e.g. air speed sensor), and generates sensor signals based thereon. The airspeed error rate sensor 14g observes an error rate associated with the air speed measured by the air speed sensor 14f and generates sensor signals based thereon. The sensor signals generated by each of the sensors 14a-14g are communicated to the vehicle state display control module 20. It should be noted that the use of sensors is merely exemplary, as one or more of the observed conditions can be modeled by other modules associated with the vehicle 10, for example. Moreover, while illustrated herein as being separate from the flight management system 12, one or more of the sensors 14a-14g may be implemented with the flight management system 12.

The human-machine interface 16 enables the pilot and/or copilot of the vehicle 10 to interact with the vehicle 10. In one example, the human-machine interface 16 includes an input device 32 and at least one display 34. The input device 32 receives inputs from the pilot and/or copilot (or other occupant) of the vehicle 10, such as a request to alter the flight plan by the flight control module 24, an input command for the autopilot control module 28, etc. The input device 32 may be implemented as a keyboard (not separately shown), a microphone (not separately shown), a touchscreen layer associated with the display 34, a touch pen, a number pad, a mouse, a touchpad, a roller ball, a pushbutton, a switch or other suitable device to receive data and/or commands from the pilot and/or copilot. Of course, multiple input devices 32 can also be utilized.

The display 34 is generally located onboard the vehicle 10. The display 34 is in communication with the vehicle state display control module 20 to display one or more user interfaces in a graphical and/or textual format to inform the pilot and/or copilot of the current and future state of the vehicle 10, as will be discussed in greater detail herein. While a single display 34 is illustrated in FIG. 1, it will be understood that the display 34 can include any number of displays that are viewable by occupants of the vehicle 10, including the pilot and/or copilot. The display 34 comprises any suitable technology for displaying information, including, but not limited to, a liquid crystal display (LCD), organic light emitting diode (OLED), plasma, or a cathode ray tube (CRT). The input device 32 and the display 34 are each in communication with the vehicle state display control module 20 over a suitable communication architecture or arrangement that facilitates transfer of data, commands, power, etc.

The one or more vehicle systems 18 receive one or more control signals from the autopilot control module 28 to control the flight path of the vehicle 10. In one example, the one or more vehicle systems 18 include an engine control system 18a, a pitch control system 18b and an air brake control system 18c. It should be noted that the one or more vehicle systems 18 is merely exemplary, and that the autopilot control module 28 can transmit data/commands to multiple other vehicle systems 18n. The engine control system 18a is responsive to the one or more control signals from the autopilot control module 28 to control a speed of the vehicle 10, and in one example, comprises one or more actuators that control a throttle associated with an engine of the vehicle 10. The pitch control system 18b is responsive to the one or more control signals to control a pitch of the vehicle 10, and in one example, comprises one or more elevator actuators. The air brake control system 18c is responsive to the one or more control signals to control a drag or angle of approach of the vehicle 10, and in one example, comprises one or more air brake actuators.

The remote processing system 22, such as an air traffic control station, includes a remote flight plan control module 36, which generates the flight plan for the vehicle 10, and may also provide the flight management system 12 with updated navigational data as is generally known. The flight plan and/or navigational data can be stored in a datastore 38, and transmitted to the vehicle 10 via a remote communication component 40, for example, a transceiver associated with the remote processing system 22, or via an ACARS datalink as known in the art. The remote communication component 40 enables two-way communications between the flight management system 12 onboard the vehicle 10 and the remote processing system 22. In one example, the flight plan and/or navigational data may be transmitted via modulated radio frequency (RF) signals. It should be noted, however, that any suitable communication method could be employed to enable communication between the vehicle 10 and the remote processing system 22 (e.g. air traffic control station).

In various embodiments, the vehicle state display control module 20 outputs one or more user interfaces or user interface data for display on the display 34 based on the sensor signals from the one or more sensors 14, the input received via the input device 32, the flight plan data from the flight control module 24, a position of the vehicle 10 based on the global positioning system 31a and based on the systems and methods of the present disclosure. In various embodiments, based on the sensor signals from the one or more sensors 14, the input received via the input device 32, the flight plan data from the flight control module 24 and the position of the vehicle 10 based on the global positioning system 31a, the vehicle state display control module 20 outputs a user interface or user interface data for display on the display 34. In various embodiments, the vehicle state display control module 20 outputs a flight plan indicator on the user interface that graphically and/or textually indicates the flight plan for the vehicle 10. In various embodiments, the vehicle state display control module 20 also outputs a converging indicator on the user interface, which graphically and/or textually indicates a convergence of a current or a predicted future flight path of the vehicle 10 to one or more legs of the selected flight plan. In various embodiments, the vehicle state display control module 20 outputs a diverging indicator on the user interface, which graphically and/or textually indicates a divergence of a current or a predicted future flight path of the vehicle 10 to one or more legs of the selected flight plan. In various embodiments, the vehicle state display control module 20 outputs a prompt on the user interface, which graphically and/or textually indicates a corrective action to enable a convergence of the current or future path of the vehicle 10 to the one or more legs of the selected flight plan. In various embodiments, the vehicle state display control module 20 also outputs an action indicator, which graphically and/or textually indicates the resultant path of the vehicle 10 if the corrective action is executed. The vehicle state display control module 20 also outputs a position indicator that graphically and/or textually indicates a position of the vehicle 10. One or more of the user interfaces or user interface data generated by the vehicle state display control module 20 are output to the display 34. In various embodiments, the one or more user interfaces or user interface data are output for display on a vertical situation display; however, the user interfaces or user interface data can also be output to a primary flight display, if desired.

Figure 2A:
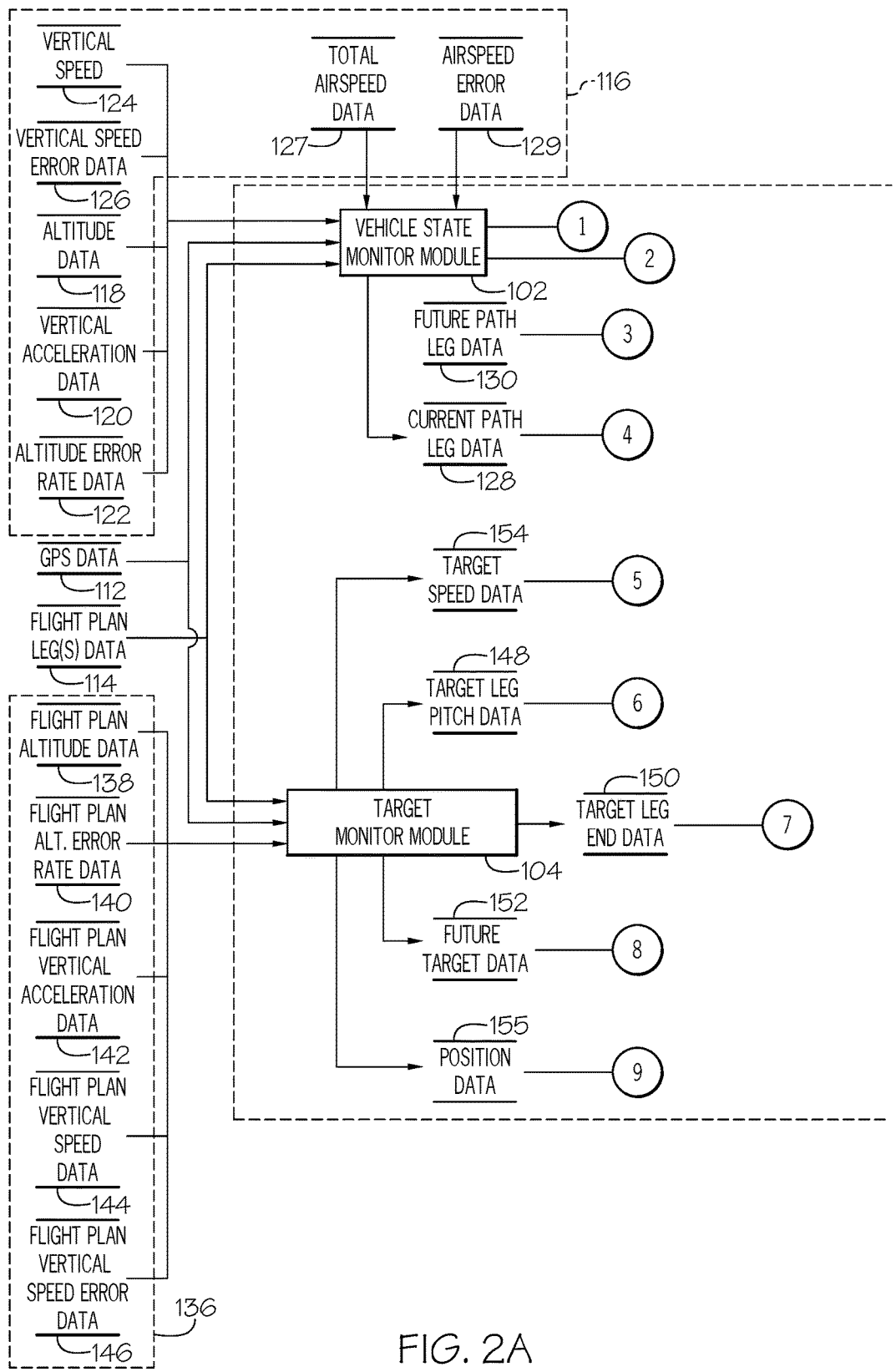
FIG. 2A is a dataflow diagram illustrating a control system of the system of FIG. 1 in accordance with various embodiments.
Figure 2B:
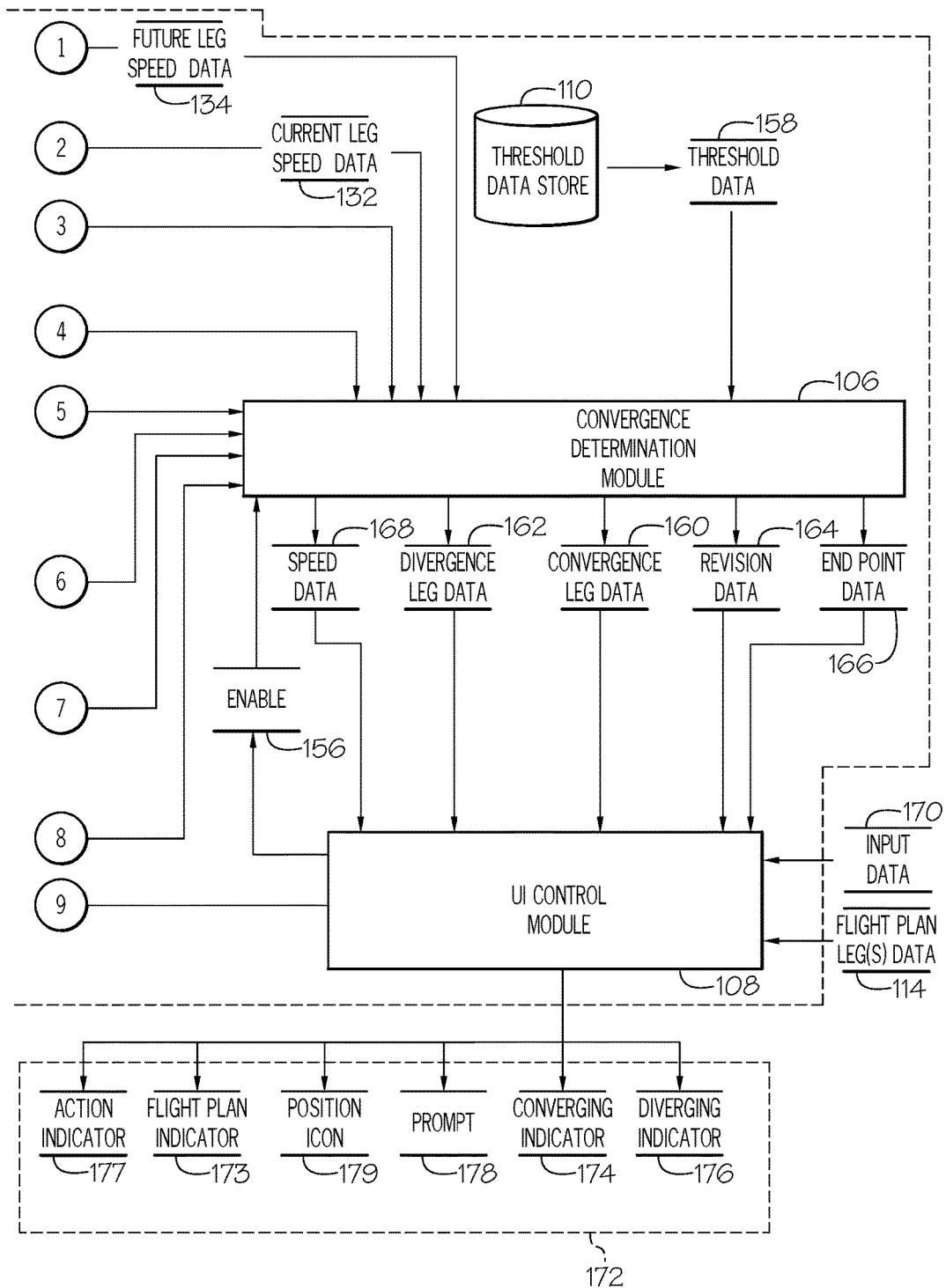
FIG. 2B is a continuation of the dataflow diagram of FIG. 2A.

Referring now to FIGS. 2A and 2B, and with continued reference to FIG. 1, a dataflow diagram illustrates various embodiments of a control system 100 for the vehicle 10 for the display of a convergence or divergence of a current or future state or path of the vehicle 10 from a planned or target flight plan, which may be embedded in the vehicle state display control module 20. Various embodiments of the control system 100 according to the present disclosure can include any number of sub-modules embedded within the vehicle state display control module 20. As can be appreciated, the sub-modules shown in FIGS. 2A and 2B may be combined and/or further partitioned to similarly display the convergence or divergence of the current or future state or path of the vehicle 10 from the planned or target flight plan for display on the display 34. Inputs to the control system 100 may be received from the remote processing system 22 (FIG. 1), received from the one or more sensors 14, received from the global positioning system 31a, received from the input device 32, received from the flight control module 24 and/or flight plan datastore 30, received from other control modules (not shown), and/or determined/modeled by other sub-modules (not shown) within the vehicle state display control module 20. In various embodiments, the vehicle state display control module 20 includes a vehicle state monitor module 102, a target monitor module 104, a convergence determination module 106, a user interface (UI) control module 108 and a threshold datastore 110.

In one embodiment, the vehicle state monitor module 102 receives as input GPS data 112. The GPS data 112 comprises the data received from the one or more sensors of the global positioning system 31a. The vehicle state monitor module 102 determines the global position of the vehicle 10 based on the GPS data 112 received from the one or more sensors of the global positioning system 31a, and based on the determined global position, the vehicle state monitor module 102 receives as input flight plan leg data 114. The flight plan leg data 114 comprises data regarding one or more legs of the selected flight plan. Based on the flight plan leg data 114, the vehicle state monitor module 102 determines a current leg of the flight plan based on the determined global position, and one or more upcoming or future legs of the flight plan. In one example, the flight plan leg data 114 is received from the flight control module 24, via the flight plan datastore 30.

In one embodiment, the vehicle state monitor module 102 receives as input sensor data 116 from the one or more sensors 14. In this example, the vehicle state monitor module 102 receives altitude data 118, which comprises the sensor signals from the altitude sensor 14a. The vehicle state monitor module 102 also receives vertical acceleration data 120, which comprises the sensor signals from the vertical acceleration sensor 14b. The vehicle state monitor module 102 receives altitude error rate data 122, which comprises the sensor signals from the altitude error rate sensor 14d. The vehicle state monitor module 102 also receives vertical speed data 124, which comprises the sensor signals from the vertical speed sensor 14c; and the vehicle state monitor module 102 receives vertical speed error rate data 126, which comprises the sensor signals from the vertical speed error rate sensor 14e. The vehicle state monitor module 102 also receives as input total airspeed data 127, which comprises the sensor signals from the air speed sensor 14f. The vehicle state monitor module 102 also receives as input airspeed error data 129, which comprises the sensor signals from the airspeed error rate sensor 14g.

Based on the current leg of the flight plan identified from the flight plan leg data 114, the GPS data 112 and the sensor data 116, the vehicle state monitor module 102 determines whether the vehicle 10 is on the current leg of the flight plan based on a comparison between the determined global position and the flight plan leg data 114. Based on this determination, the vehicle state monitor module 102 determines whether the altitude of the vehicle 10 is within about 250 feet (ft) with respect to a vertical profile associated with the current leg, with the vertical profile for the current leg retrieved from the flight plan leg data 114 and the altitude of the vehicle 10 determined based on the altitude data 118. If true, the vehicle state monitor module 102 computes current path leg data 128. The current path leg data 128 comprises a current state of the vehicle 10. In one example, the vehicle state monitor module 102 computes the current path leg data 128 based on the following equation for the path control law:

$$\text{DELTA THETA}_{TRACK} = (V/S_{gain} * V/S_{Error} + He_{gain} * He)/\text{TAS} \quad (1)$$

Wherein DELTA THETA$_{TRACK}$ is the pitch command computed for the current state or path of the vehicle 10 on the current leg or current path leg data 128; V/S$_{gain}$ is the vertical speed gain, which is a default calibration value associated with the vehicle 10 that is defined based on simulated testing of the vehicle 10; V/S$_{Error}$ is the vertical speed error rate data 126; He$_{gain}$ is the altitude error gain, which is a default calibration value associated with the vehicle 10 that can be retrieved from a memory associated with the vehicle state monitor module 102; He is the altitude error which is the difference between the current altitude from the altitude data 118 and the altitude error rate data 122 at the point based on the flight plan leg data 114; and TAS is the total air speed from the total airspeed data 127. The pitch command can comprise the pitch or pitch angle for the vehicle 10.

The vehicle state monitor module 102 sets the computed current path leg data 128 for the convergence determination module 106. The computed current path leg data 128 comprises the current state or path of the vehicle 10 associated with the current flight leg, from a start point of the flight leg to an end point of the flight leg. Thus, the computed current path leg data 128 comprises the current state or path of the vehicle 10 based on the sensor data 116 from a start point to an end point of a leg of a flight plan.

Based on a future flight leg identified from the flight plan leg data 114 and the current path leg data 128, the vehicle state monitor module 102 also computes future path leg data 130 or the future state of the vehicle 10. In one example, the vehicle state monitor module 102 computes the future path leg data 130 by interpolating the computed DELTA THETA$_{TRACK}$ with a fixed ramp value for the future flight leg. Generally, the interpolation is based on ramping up or down the computed DELTA THETA$_{TRACK}$ at fixed intervals for each future flight leg. For example, a fixed interval can be a period of time, such as about 200.0 milliseconds (ms) or about 1.0 seconds (s). The ramp value comprises a default value associated with the vehicle 10, which is stored in memory associated with the vehicle state monitor module 102. In one example, the ramp value comprises a number of iterations required to reach the end point of the future flight leg. For each future flight leg identified from the flight plan leg data 114, based on the current path leg data 128, the vehicle state monitor module 102 computes the future path leg data 130 recursively by interpolating the computed DELTA THETA$_{TRACK}$. Stated another way, the vehicle state monitor module 102 computes the future path leg data 130 recursively, via interpolation from the computed current path leg data 128, for each of the future legs identified from the flight plan leg data 114. The vehicle state monitor module 102 sets the future path leg data 130 for the convergence determination module 106. The computed future path leg data 130 comprises the predicted future path of the vehicle 10 associated with each future flight leg, from a start point of the future flight leg to an end point of the future flight leg. Thus, the computed future path leg data 130 comprises the predicted future path of the vehicle 10 based on the sensor data 116 from a start point to an end point of a future leg of a flight plan, which is interpolated linearly until the endpoint of the future leg.

Based on the current leg of the flight plan identified from the flight plan leg data 114 and the GPS data 112, the vehicle state monitor module 102 determines whether the vehicle 10 is geographically off the current leg of the flight plan based on the flight plan leg data 114 and the determined global position of the vehicle 10 based on the GPS data 112. Based on the determination that the vehicle 10 is off the current leg of the flight plan, the vehicle state monitor module 102 determines whether the altitude of the vehicle based on the altitude data 118 is greater than about 250 feet (ft) above a vertical profile associated with the current leg of the flight plan based on the flight plan leg data 114. If true, the vehicle state monitor module 102 computes current leg speed data 132. In one example, the vehicle state monitor module 102 computes the current leg speed data 132 based off of computed pitch angle, which is based on the following equation (Speed on Elevator Control Law):

$$\text{DELTA THETA}_{TRACK\ SPEED\ ELEVATOR} = (IAS_{gain} * IAS_{Error} + SPD\ rate_{gain} * IAS_{rate})/V \quad (2)$$

Wherein DELTA THETA$_{TRACK\ SPEED\ ELEVATOR}$ is the pitch computed for the autopilot control module 28 (in this example, the vertical navigation (VNAV) autopilot) for the current leg or current leg speed data 132; IAS$_{gain}$ is the indicated airspeed gain, which is determined by the navigation system 31 or the autopilot control module 28 and can comprise a default calibration value associated with the vehicle 10; IAS$_{Error}$ is the indicated airspeed error from the airspeed error data 129; SPD rate$_{gain}$ the vertical speed rate gain, which is computed from the vertical acceleration data 120 and the vertical speed data 124; $IAS_{rate}$ is the indicated airspeed rate, which is determined from the total airspeed data 127 and the airspeed error data 129; and V is the speed from the vertical speed data 124. The pitch computed with equation (2), DELTA $THETA_{TRACK\ SPEED\ ELEVATOR}$, in the example of the vehicle 10 as an aircraft, comprises a required pitch or pitch angle of the aircraft derived using the speed on elevator control law, which once computed allows the autopilot control module 28 to derive the speed required for the current leg of the flight plan based on the determined DELTA $THETA_{TRACK\ SPEED\ ELEVATOR}$. Stated another way, the DELTA $THETA_{TRACK\ SPEED\ ELEVATOR}$ comprises a pitch angle based on speed on elevator control algorithm for the pitch control system 18b for controlling the aircraft pitch and hence the speed and altitude of the aircraft by the autopilot control module 28. The vehicle state monitor module 102 sets the computed current leg speed data 132 for the convergence determination module 106. DELTA $THETA_{TRACK\ SPEED\ ELEVATOR}$ can also be used by the autopilot control module 28 to control an altitude of the aircraft through the pitch control system 18b, in the example of the vehicle 10 as an aircraft.

Based on a future flight leg identified from the flight plan leg data 114 and the current leg speed data 132, the vehicle state monitor module 102 also computes future leg speed data 134. In one example, the vehicle state monitor module 102 computes the future leg speed data 134 by interpolating the computed DELTA $THETA_{TRACK\ SPEED\ ELEVATOR}$ at a fixed ramp value for the future flight leg. Generally, the interpolation is based on ramping up or down the computed DELTA $THETA_{TRACK\ SPEED\ ELEVATOR}$ at fixed intervals for each future flight leg. For example, a fixed interval can be a period of time, such as about 200.0 milliseconds (ms) or about 1.0 seconds (s). The ramp value comprises a default value associated with the vehicle 10, which is stored in memory associated with the vehicle state monitor module 102. In one example, the ramp value comprises a number of iterations required to reach the end point of the future flight leg. For each future flight leg identified from the flight plan leg data 114, based on the current leg speed data 132, the vehicle state monitor module 102 computes the future leg speed data 134 recursively by interpolating the computed DELTA $THETA_{TRACK\ SPEED\ ELEVATOR}$. Stated another way, the vehicle state monitor module 102 computes the future leg speed data 134 recursively, via interpolation from the computed current leg speed data 132, for each of the future legs identified from the flight plan leg data 114. Thus, the computed future leg speed data 134 comprises the predicted future speed of the vehicle 10 based on the sensor data 116 from a start point to an end point of a future leg of a flight plan, which is interpolated linearly until the endpoint of the future leg. The vehicle state monitor module 102 sets the future leg speed data 134 for the convergence determination module 106.

The target monitor module 104 receives flight plan data 136 as input. In various embodiments, the flight plan data 136 is received from the flight plan datastore 30, via the flight control module 24 and comprises the selected flight plan for the vehicle 10. In one example, the target monitor module 104 receives as input flight plan altitude data 138, flight plan altitude error rate data 140, flight plan vertical acceleration data 142, flight plan vertical speed data 144 and flight plan vertical speed error rate data 146. Each of the flight plan altitude data 138, the flight plan altitude error rate data 140, the flight plan vertical acceleration data 142, the flight plan vertical speed data 144 and the flight plan vertical speed error rate data 146 can be retrieved from the flight plan datastore 30 via the flight control module 24 and/or the vehicle state display control module 20. The flight plan altitude data 138 comprises the target altitude for the vehicle 10 for the particular leg of the flight plan. The flight plan altitude error rate data 140 comprises the target altitude error rate for the altitude of the vehicle 10 for particular the leg of the flight plan. The flight plan vertical acceleration data 142 comprises the target vertical acceleration for the vehicle 10 based on the particular leg of the flight plan. The flight plan vertical speed data 144 comprises the target vertical speed for the vehicle 10 based on the particular leg of the flight plan; and the flight plan vertical speed error rate data 146 comprises the target vertical speed error for the vehicle 10 based on the particular leg of the flight plan. It should be noted that the use of the word "target" is to denote planned (e.g. pre-planned) values associated with the travel of the vehicle 10 along the selected flight plan. Stated another way, the target values received from the flight plan data 136 provide the planned values for the altitude, altitude error rate, vertical acceleration, vertical speed and vertical speed error rate of the vehicle 10 as the vehicle 10 travels along the flight plan stored in the flight plan datastore 30 or the target state for the vehicle 10.

The target monitor module 104 also receives as input the GPS data 112 and the flight plan leg data 114. Based on the GPS data 112, the target monitor module 104 determines or identifies a current leg of the flight plan based on the flight plan leg data 114. The target monitor module 104 also interprets the GPS data 112 and determines a geographical coordinate position of the vehicle 10. The target monitor module 104 sets the determined position of the vehicle 10 as position data 155 for the UI control module 108.

Based on the determination of the current leg from the flight plan leg data 114, the target monitor module 104 receives as input the flight plan data 136 associated with the current leg of the flight plan and the sensor data 116. The target monitor module 104 determines whether the altitude of the vehicle 10, determined based on the altitude data 118, is within about 250 feet (ft) with respect to a vertical profile associated with the current leg of the flight plan from the flight plan leg data 114. Based on this determination, the target monitor module 104 computes target leg pitch data 148 based on the flight plan data 136 for the determined current leg. In one example, the target monitor module 104 computes the target leg pitch data 148 based on the following equation:

$$\text{DELTA THETA}_{CAPT} = \text{path capture gain} \cdot \arcsin(V/S_{Error}/V) \quad (3)$$

Wherein DELTA $THETA_{CAPT}$ is the target pitch command required for the vehicle 10 for capturing the target flight path for the current leg of the flight plan or target leg pitch data 148; path capture gain is the required gain to control the effect of desired vertical acceleration on the path control law, and comprises a default value that is associated with the vehicle 10 and determined based on calibration or experimental data; $V/S_{Error}$ is the flight plan vertical speed error rate data 146; and V is the vertical speed from the flight plan vertical speed data 144. The target monitor module 104 sets the computed target leg pitch data 148 for the convergence determination module 106.

Based on the flight plan leg data 114, the target monitor module 104 determines or identifies an end point of the current leg of the selected flight plan. Based on the determination of the end point from the flight plan leg data 114, the target monitor module 104 receives as input the flight plan data 136 associated with determined end point for current leg of the flight plan. The target monitor module 104 computes target leg end data 150 based on the flight plan data 136 for the determined end point of the current leg using equation (3), above. The target monitor module 104 sets the target leg end data 150 for the convergence determination module 106.

Based on the flight plan leg data 114 and the flight plan data 136, the target monitor module 104 computes future target data 152 for each future leg of the flight plan, which comprises a future state for the vehicle 10. The future leg(s) of the flight plan are determined based on the flight plan leg data 114 and the GPS data 112. Thus, for each future leg, the target monitor module 104 receives the flight plan data 136 and computes the DELTA THETA$_{CAPT}$, including the end point for each future leg, using equation (3) above. In one example, the target monitor module 104 computes the future target data 152 by interpolating the computed DELTA THETA$_{CAPT}$ at a fixed ramp value for the future leg. Generally, the interpolation is based on ramping up or down the computed DELTA THETA$_{CAPT}$ at fixed intervals for each future flight leg. For example, a fixed interval can be a period of time, such as about 200.0 milliseconds (ms) or about 1.0 seconds (s). The ramp value comprises a default value associated with the vehicle 10, which is stored in memory associated with the target monitor module 104. In one example, the ramp value comprises a number of iterations required to reach the end point of the future leg. For each future leg identified from the flight plan leg data 114, based on the flight plan data 136, the target monitor module 104 computes the future target data 152 recursively by interpolating the computed DELTA THETA$_{CAPT}$. Stated another way, the target monitor module 104 computes the future target data 152 recursively, via interpolation from the computed target leg pitch data 148, for each of the future legs identified from the flight plan leg data 114. Thus, the future target data 152 comprises the future target paths of the vehicle 10, as determined based on the flight plan data 136 associated with each respective future leg of the selected flight plan. The target monitor module 104 sets the future target data 152 for the convergence determination module 106.

Based on the flight plan leg data 114, the GPS data 112 and the flight plan data 136, the target monitor module 104 determines whether the vehicle 10 is geographically off the current leg of the flight plan. Based on this determination, the target monitor module 104 determines whether the altitude error or the difference between the current altitude from the altitude data 118 and the altitude error rate data 122 at the current geographical position is greater than about 250 feet (ft) based on the sensor data 116, or whether the difference between the vertical speed of the vehicle 10 based on the vertical speed data 124 and the flight plan vertical speed data 144 is greater than 10 knots. Based on this determination, the target monitor module 104 computes target speed data 154 for each of the legs of the flight plan. In one example, the target monitor module 104 computes the target speed data 154 based on the following equation for computing the pitch command:

$$\text{DELTA THETA}_{CAPT\ SPD\ ELEVATOR} = SPD\ \text{rate}_{gain} * (IAS_{rate} - \text{Target capture rate}) \quad (4)$$

Wherein DELTA THETA$_{CAPT\ SPD\ ELEVATOR}$ is the target pitch angle for the autopilot control module 28 (in this example, the vertical navigation (VNAV) autopilot) for capturing the target flight path or target speed data 154; SPD rate$_{gain}$ is the flight plan vertical speed rate gain, which is computed from the flight plan vertical acceleration data 142 and the flight plan vertical speed data 144; IAS$_{rate}$ is the indicated airspeed rate for the target flight plan, which is received from the flight plan datastore 30; and Target capture rate is the required vertical speed for the vehicle 10 to capture the target flight path, which is a default value associated with the vehicle 10 that is determined from calibration or experimental data. The pitch angle computed with equation (4), DELTA THETA$_{CAPT\ SPD\ ELEVATOR}$, in the example of the vehicle 10 as an aircraft, comprises a pitch angle for capture control and hence the target speed based on speed on elevator control law for controlling the speed and altitude of the aircraft by the autopilot control module 28. The vehicle state monitor module 102 sets the computed target speed data 154 for the convergence determination module 106.

The threshold datastore 110 stores one or more thresholds for the flight path of the vehicle 10. In various embodiments, the threshold datastore 110 stores a threshold for a change in altitude, a threshold for a change in vertical speed and a threshold for a change in vertical speed error. Stated another way, the threshold datastore 110 stores threshold data 158, which provides one or more thresholds for changes in altitude, vertical speed, and vertical speed error. Each of the thresholds stored in the threshold datastore 110 can comprise default values, which are associated with the particular vehicle 10. In other embodiments, one or more of the thresholds can be user defined, via input received from the input device 32, for example.

The convergence determination module 106 receives as input an enable command 156 from the UI control module 108. The enable command indicates that an input command for an autopilot of the vehicle 10 has been received to execute a selected flight plan via the input device 32. In one example, the enable command 156 is generated based on the receipt of an input command for a vertical navigation (VNAV) autopilot, such as for executing an approach to landing flight plan. Based on the receipt of the enable command 156, the convergence determination module 106 receives as input the current path leg data 128 (i.e. a current state of the vehicle 10) and the target leg pitch data 148 (i.e the target state of the vehicle 10). The convergence determination module 106 compares the current path leg data 128 and the target leg pitch data 148, and determines whether the current path leg data 128 differs from the target leg pitch data 148. If the current path leg data 128 does not differ from the target leg pitch data 148, the convergence determination module 106 sets convergence leg data 160 for the UI control module 108. The convergence leg data 160 indicates that the current path of the vehicle 10 will converge to the target path of the vehicle 10 for the current leg of the flight plan. Stated another way, the convergence leg data 160 indicates that for a particular leg of the flight plan, such as the current leg, the current, actual path (current state) of the vehicle 10 matches or is within a tolerance for the particular planned or target flight path (target state) of the vehicle 10 for the particular leg in the flight plan data.

If the current path leg data 128 differs from the target leg pitch data 148, the convergence determination module 106 sets divergence leg data 162 for the UI control module 108. The divergence leg data 162 indicates that the current path or pitch of the vehicle 10 will not converge to the target path or pitch of the vehicle 10 for the current leg of the flight plan based on the difference between the current path leg data 128 and the target leg pitch data 148. Stated another way, the divergence leg data 162 indicates that for a particular leg of the flight plan, such as the current leg, the current, actual path or pitch of the vehicle 10 does not match or correspond with a planned target flight path or pitch of the vehicle 10 for the particular leg in the flight plan data.

Based on the determination that the current path leg data 128 differs from the target leg pitch data 148, the convergence determination module 106 determines whether a modification or revision can be made to the current path of the vehicle 10 to capture or converge on the planned target flight path. In this regard, based on the difference between the current path leg data 128 and the target leg pitch data 148, the convergence determination module 106 determines whether a change in a vertical speed or a change in the altitude of the vehicle 10 will enable the vehicle 10 to converge to the target flight path. In one example, the convergence determination module 106 determines that a revision can be made based on the difference between the current path leg data 128 and the target leg pitch data 148 as being within a predefined or default range. In certain embodiments, the convergence determination module 106 determines a revision can be made based on input received from other modules of the vehicle 10, such as the flight management system 12. Based on the determination that a revision can be made, the convergence determination module 106 retrieves the threshold data 158 from the threshold datastore 110. The convergence determination module 106 evaluates the threshold data 158 and determines whether the revision is acceptable based on the threshold for changes in altitude, vertical speed and vertical speed error retrieved from the threshold datastore 110. If the revision is acceptable, the convergence determination module 106 sets revision data 164 for the UI control module 108. The revision data 164 comprises one or more corrective actions to the current or predicted flight path of the vehicle 10 to capture the target flight path. In various embodiments, the revision data 164 also includes the resultant path of the vehicle 10 if the corrective action is completed by the pilot, copilot and/or autopilot control module 28. Generally, the resultant path comprises the target current or future path of the vehicle 10.

Based on the receipt of the enable command 156, the convergence determination module 106 also receives as input the target leg end data 150, which identifies the target end point of the current leg of the flight plan. The convergence determination module 106 compares the target leg end data 150 and the end point of the current path leg data 128, and determines whether the target leg end data 150 differs from the end point of the current path leg data 128.

If the end point of the current path leg data 128 differs from the target leg end data 150, the convergence determination module 106 sets end point data 166 for the UI control module 108 that indicates a divergence at the end point. If the end point of the current path leg data 128 does not differ from the target leg end data 150, the convergence determination module 106 sets end point data 166 for the UI control module 108 that indicates a convergence at the end point.

Based on the receipt of the enable command 156, the convergence determination module 106 also receives as input the current leg speed data 132 and the target speed data 154 associated with the current leg of the target flight path. The convergence determination module 106 compares the current leg speed data 132 and the target speed data 154, and determines whether the current leg speed data 132 differs from the target speed data 154.

If the current leg speed data 132 differs from the target speed data 154, the convergence determination module 106 sets speed data 168 for the UI control module 108 that indicates a divergence from the target speed of the vehicle 10 for the particular leg of the selected flight plan. If the current leg speed data 132 does not differ from the target speed data 154, the convergence determination module 106 sets speed data 168 for the UI control module 108 that indicates a convergence of the speed or that the speed for the vehicle 10 corresponds with or is within an acceptable tolerance for the target vertical speed of the vehicle 10 along the particular leg of the selected flight plan.

Once the convergence determination module 106 has compared the current path leg data 128, the target leg pitch data 148, the target leg end data 150, the current leg speed data 132 and the target speed data 154, the convergence determination module 106 receives as input the future path leg data 130 and the future target data 152. For each leg of the flight plan, the convergence determination module 106 compares the future path leg data 130 and the future target data 152 to determine whether a difference exists between the target leg pitch data 148 and the future target data 152 (i.e. determines a future state for the vehicle 10) for each future leg of the flight plan. Based on the determination of a difference, the convergence determination module 106 sets the divergence leg data 162 to indicate a divergence of the predicted path or pitch of the vehicle 10 as compared to the target path or pitch for the respective future leg of the flight plan. If the difference between the future path leg data 130 and the future target data 152 does not differ, the convergence determination module 106 sets the convergence leg data 160 to indicate a convergence of the predicted path or pitch of the vehicle 10 with the target path or pitch for the respective future leg of the flight plan.

Based on the determination that the future path leg data 130 differs from the future target data 152, the convergence determination module 106 also determines whether a modification or revision can be made to the predicted path of the vehicle 10 to capture or converge on the future planned target flight path. In this regard, based on the difference between the future path leg data 130 and the future target data 152, the convergence determination module 106 determines whether a change in a vertical speed or a change in the altitude of the vehicle 10 will enable the vehicle 10 to converge to the future target flight path. In one example, the convergence determination module 106 determines that a revision can be made based on the difference between the current path leg data 128 and the target leg pitch data 148 as being within a predefined or default range. In certain embodiments, the convergence determination module 106 determines a revision can be made based on input received from other modules of the vehicle 10, such as the flight management system 12. If the convergence determination module 106 determines that a revision can be made, the convergence determination module 106 retrieves the threshold data 158 from the threshold datastore 110. The convergence determination module 106 evaluates the threshold data 158 and determines whether the revision is acceptable based on the threshold for changes in altitude, vertical speed and vertical speed error retrieved from the threshold datastore 110. If the revision is acceptable, the convergence determination module 106 sets the revision data 164 for the UI control module 108.

Once the convergence determination module 106 has compared the current path leg data 128, the target leg pitch data 148, the target leg end data 150, the current leg speed data 132 and the target speed data 154, the convergence determination module 106 receives as input the future leg speed data 134 and the target speed data 154. For each leg of the flight plan, the convergence determination module 106 compares the future leg speed data 134 and the target speed data 154 to determine whether a difference exists between the future leg speed data 134 and the target speed data 154 for each future leg of the flight plan. Based on the determination of a difference, the convergence determination module 106 sets the speed data 168 to indicate a divergence in the speed of the vehicle 10 as compared to the target speed for the respective future leg of the flight plan. If the difference between the future leg speed data 134 and the target speed data 154 does not differ, the convergence determination module 106 sets the speed data 168 to indicate a convergence of the speed of the vehicle 10 with the target speed for the respective future leg of the flight plan.

The UI control module 108 receives as input user input data 170. The input data 170 comprises one or more inputs received from the pilot and/or copilot via the input device 32. The UI control module 108 interprets the input data 170 and sets the enable 156 for the convergence determination module 106.

The UI control module 108 also receives as input the position data 155, the flight plan leg data 114, the convergence leg data 160, the divergence leg data 162, the revision data 164, the end point data 166 and the speed data 168. Based on the position data 155, the flight plan leg data 114, the convergence leg data 160, the divergence leg data 162, the revision data 164, the end point data 166 and the speed data 168, the UI control module 108 outputs a user interface 172 for display on the display 34 onboard the vehicle 10. In various embodiments, the UI control module 108 generates the user interface 172, which comprises one or more signals for the display 34. In one example, the user interface 172 is a graphical and textual user interface, which includes a flight plan indicator 173, a converging indicator 174, a diverging indicator 176, a prompt 178, an action indicator 177 and a position icon 179.

The flight plan indicator 173 graphically and/or textually indicates the one or more legs of the selected flight plan for the vehicle 10, based on the flight plan leg data 114. The converging indicator 174 comprises a graphical and/or textual indicator that indicates a convergence of a current or future state or path of the vehicle 10 to the one or more legs of the selected flight plan, based on the convergence leg data 160, the end point data 166 and the speed data 168. For example, the converging indicator 174 comprises a line in a first color including, but limited to, a green line. In one example, the converging indicator 174 is superimposed over the flight plan indicator 173 to graphically illustrate the convergence of the current or future path of the vehicle 10 to one or more legs of the selected flight plan. The diverging indicator 176 comprises a graphical and/or textual indicator that indicates a divergence of the current or future state or path of the vehicle 10 from the one or more legs of the selected flight plan, based on the divergence leg data 162, the end point data 166 and the speed data 168. For example, the diverging indicator 176 comprises a line in a second color, which is different than the first color, including, but limited to, a red line. In one example, the diverging indicator 176 is positioned relative to one or more legs of the selected flight plan to illustrate the divergence of the current or future state of the vehicle 10 from the selected flight plan. In the example of FIGS. 3-6, the converging indicator 174 comprises a dot-dash line, the flight plan indicator 173 comprises a dash line and the diverging indicator 176 comprises a solid line. It will be understood that the use of different line types for the converging indicator 174, the flight plan indicator 173 and the diverging indicator 176 are merely exemplary, as the converging indicator 174, the flight plan indicator 173 and the diverging indicator 176 can each have a different color and/or a different line type to visually convey to the user the current and future state of the vehicle 10.

The prompt 178 comprises a graphical and/or textual notification, such as a balloon or pop-up box, that graphically or textually indicates a corrective action to be taken by the pilot, copilot and/or autopilot control module 28 to correct the current or predicted (future) path of the vehicle 10 such that the vehicle 10 converges to the one or more legs of the selected flight plan, based on the revision data 164. The action indicator 177 comprises a graphical and/or textual indicator that graphically or textually represents the convergence of the current or future path of the vehicle 10 to one or more legs of the selected flight plan, if the pilot, copilot and/or autopilot control module 28 executed the corrective action in the prompt 178, based on the revision data 164. Stated another way, the action indicator 177 graphically and/or textually indicates the resultant path of the vehicle 10 if the corrective action is executed. In various embodiments, the action indicator 177 comprises a textual notification and a graphical representation of the resultant path. The position icon 179 comprises a graphical and/or textual icon that indicates the current geographical position of the vehicle 10, based on the position data 155.

Generally, based on the flight plan leg data 114, the UI control module 108 outputs the flight plan indicator 173 for display on the user interface 172. Based on the position data 155, the UI control module 108 outputs the position icon 179 for display on the user interface 172. Based on the convergence leg data 160, the end point data 166 and the speed data 168, the UI control module 108 outputs the converging indicator 174 for display on the user interface 172. Based on the divergence leg data 162, the end point data 166 and the speed data 168, the UI control module 108 outputs the diverging indicator 176 for display on the user interface 172. Based on the revision data 164, the UI control module 108 outputs the prompt 178 for display on the user interface 172. In various embodiments, based on the revision data 164, the UI control module 108 also outputs the action indicator 177.

Figure 3:
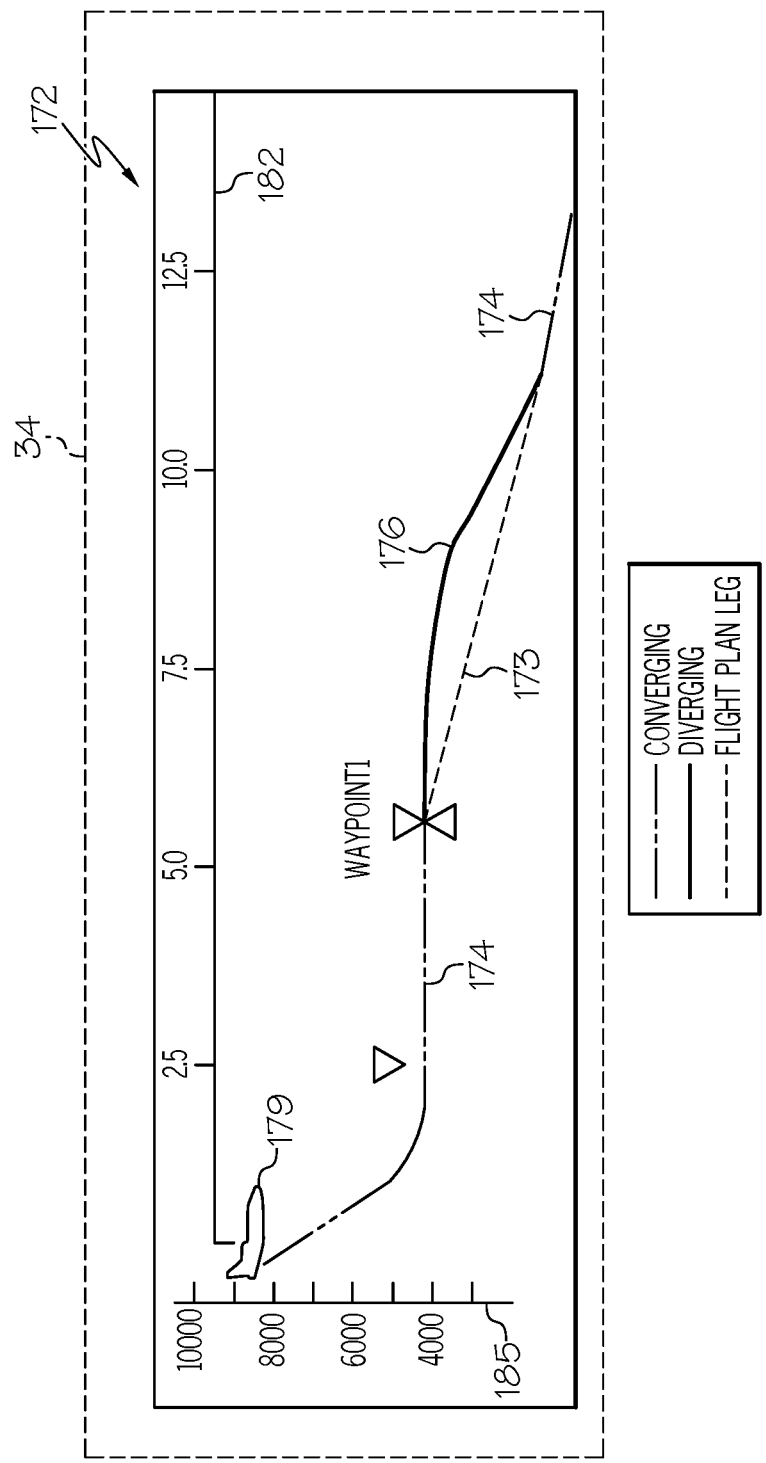
FIG. 3 is an illustration of one exemplary user interface, which displays the current and future vehicle state, for display on the display of the vehicle of FIG. 1 in accordance with various embodiments.

For example, with reference to FIG. 3, one example of the user interface 172 is shown. In this example, the user interface 172 comprises a vertical state display (VSD) associated with the vehicle 10. In the example of the user interface 172 as the VSD, the user interface 172 includes a y-axis 180 that denotes an altitude in meters (m) or feet (ft), and an x-axis 182 that denotes a distance in nautical miles (n.m.). It should be noted that the units used herein on the user interface 172 are merely exemplary, as other units of measure for altitude may be used depending upon a preference, such as an operator's preference or owner's preference, associated with the vehicle 10. The converging indicator 174 is superimposed over the flight plan indicator 173 at which point the current and future state of the vehicle 10 converges, and diverging indicator 176 is spaced apart from the flight plan indicator 173 to graphically indicate the divergence of the future state of the vehicle 10 from the one or more legs of the selected flight plan. As the convergence determination module 106 determines the convergence leg data 160, the divergence leg data 162, the end point data 166 and the speed data 168 for the current and future state of the vehicle 10 along the selected flight plan, the converging indicator 174 and the diverging indicator 176 are displayed for each leg of the selected flight plan to provide the pilot and/or co-pilot with situational awareness of the current and future movement of the vehicle 10. This reduces the work load of the pilot and/or copilot. It should be noted that the user interface 172 can also include other indicators, such as one or more triangles that graphically indicate one or more waypoints, and the one or more waypoints can be determined based on the flight plan leg data 114.

Figure 4:
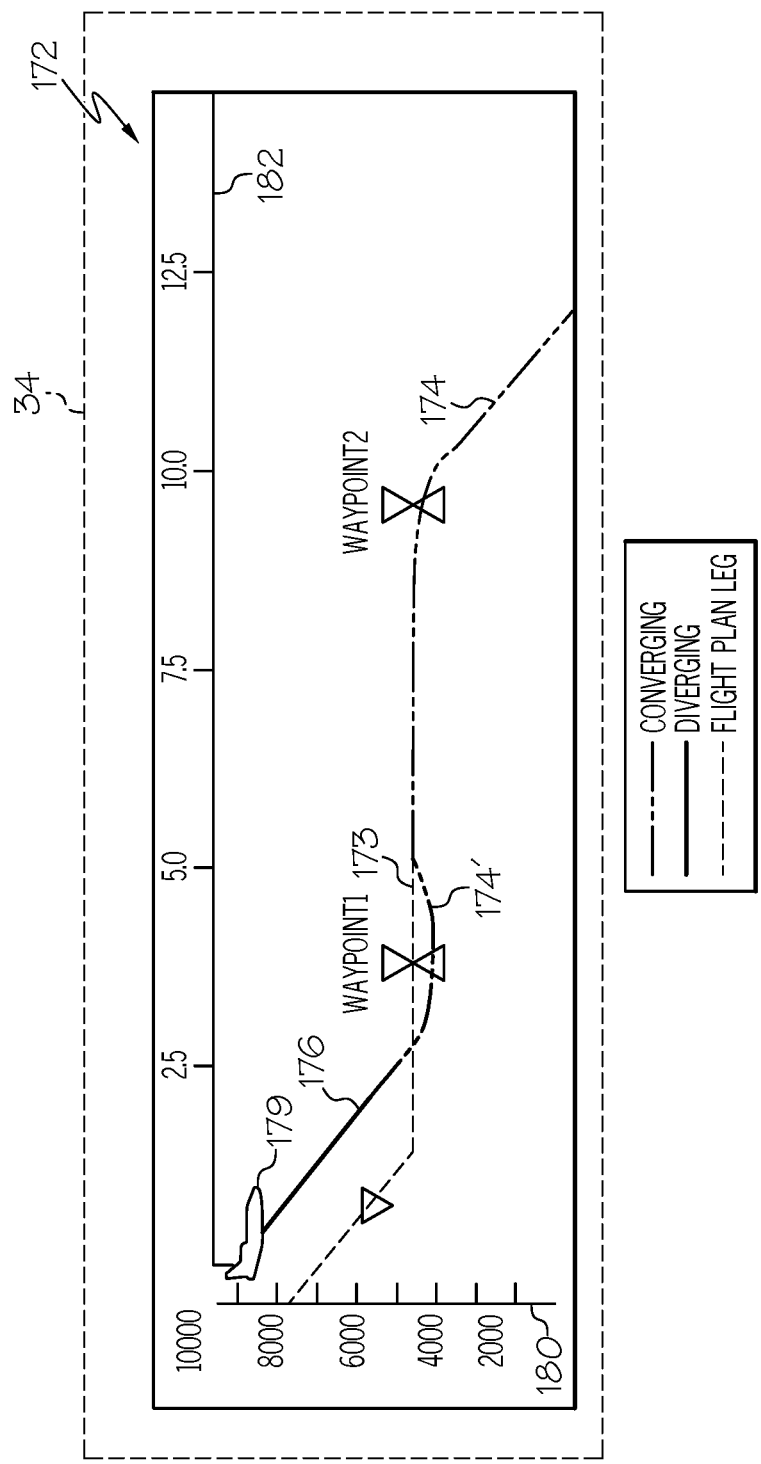
FIG. 4 is an illustration of another exemplary user interface, which displays the current and future vehicle state, for display on the display of the vehicle of FIG. 1 in accordance with various embodiments.

With reference to FIG. 4, another example of the user interface 172 is shown. In this example, the user interface 172 also comprises the VSD associated with the vehicle 10; and includes the y-axis 180 that denotes the altitude in meters (m) or feet (ft), and the x-axis 182 that denotes the distance in nautical miles (n.m.). It should be noted that the units used herein on the user interface 172 are merely exemplary, as other units of measure for altitude may be used depending upon a preference, such as an operator's preference or owner's preference, associated with the vehicle 10. The converging indicator 174 is superimposed over a portion of the flight plan indicator 173 at which the future state of the vehicle 10 converges, and the converging indicator 174' is spaced apart from the flight plan indicator 173 to illustrate that the convergence of the current or future path of the vehicle 10 is within a tolerance for the leg of the selected flight plan (for example, within about 250 feet (ft)). The diverging indicator 176 is spaced apart from the flight plan indicator 173 to graphically indicate the divergence of the current state of the vehicle 10 from the leg of the selected flight plan. As the convergence determination module 106 determines the convergence leg data 160, the divergence leg data 162, the end point data 166 and the speed data 168 for the current and future state of the vehicle 10 along the selected flight plan, the converging indicator 174, the converging indicator 174' and the diverging indicator 176 are displayed for each portion of the planned flight path to provide the pilot and/or co-pilot with situational awareness of the current and future movement of the vehicle 10. It should be noted that the user interface 172 can also include other indicators, such as one or more triangles that graphically indicate one or more waypoints, and the one or more waypoints can be determined from the flight plan leg data 114.

Figure 5:
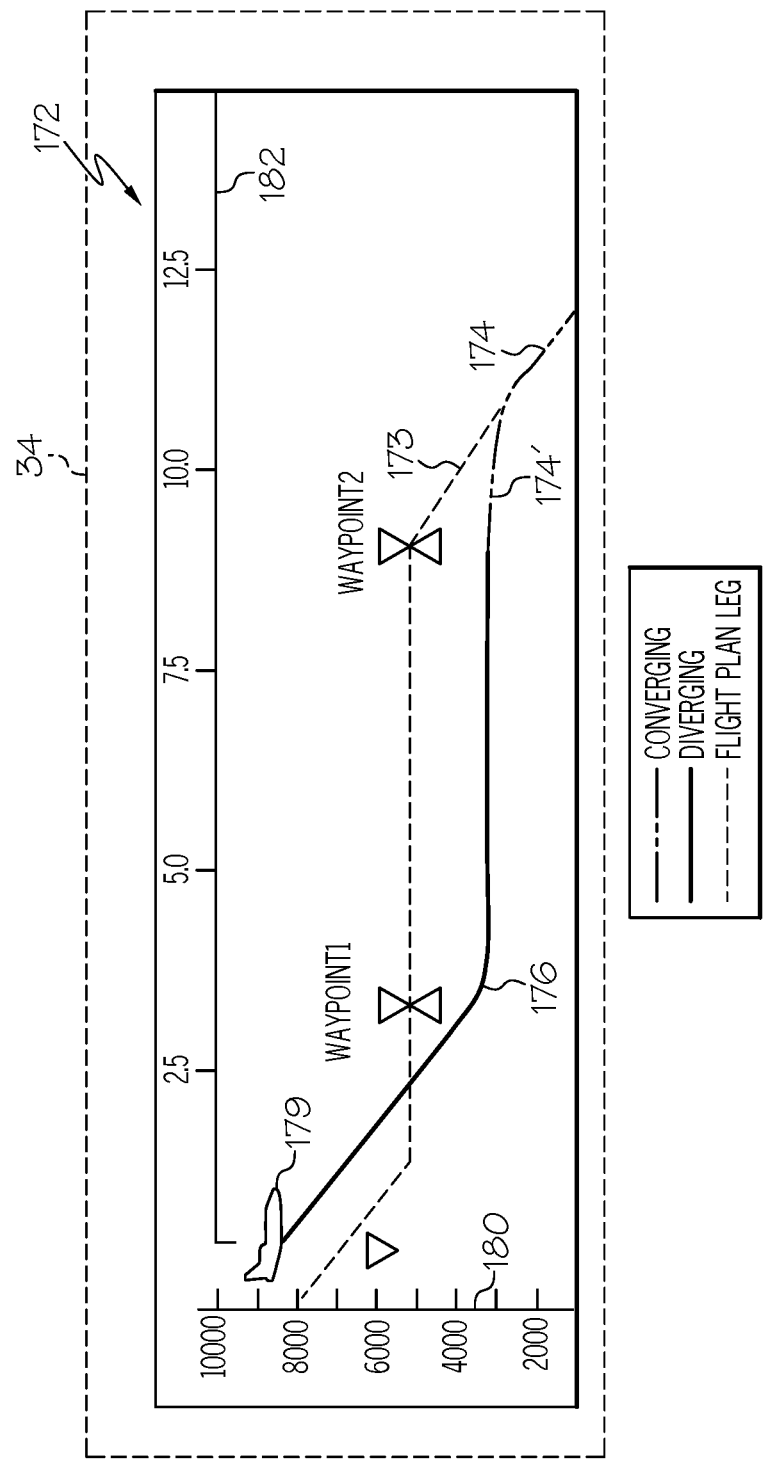
FIG. 5 is an illustration of another exemplary user interface, which displays the current and future vehicle state, for display on the display of the vehicle of FIG. 1 in accordance with various embodiments.
Figure 6:
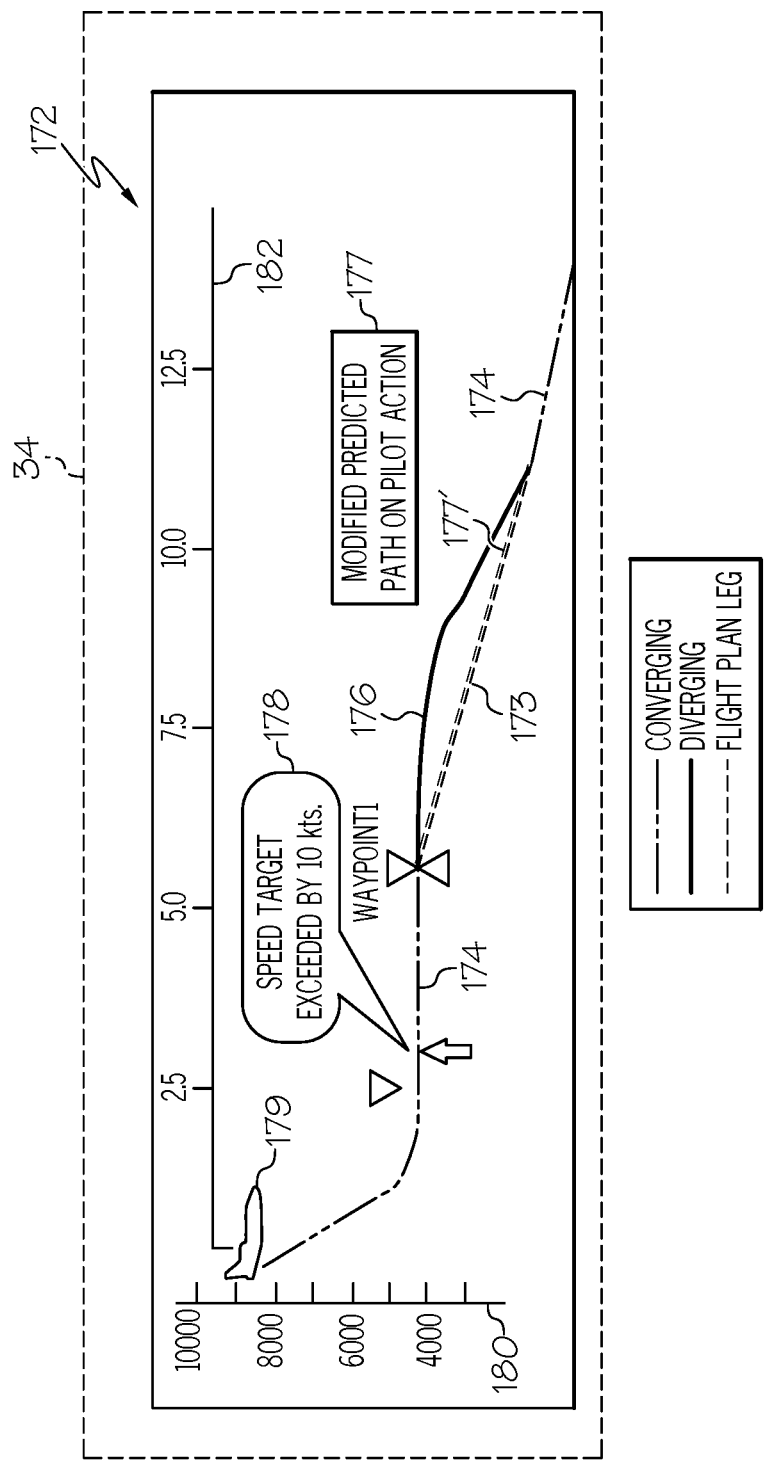
FIG. 6 is an illustration of another exemplary user interface, which displays the current and future vehicle state, for display on the display of the vehicle of FIG. 1 in accordance with various embodiments.

With reference to FIGS. 5 and 6, another example of the user interface 172 is shown. In this example, the user interface 172 also comprises the VSD associated with the vehicle 10; and includes the y-axis 180 that denotes the altitude in meters (m) or feet (ft), and the x-axis 182 that denotes the distance in nautical miles (n.m.). The converging indicator 174 is superimposed over a portion of the flight plan indicator 173 to which the future state of the vehicle 10 converges with the leg of the selected flight plan. The diverging indicator 176 is spaced apart from the flight plan indicator 173 to graphically indicate the divergence of the current and the future state of the vehicle 10 from one or more legs of the selected flight plan. With reference to FIG. 6, the prompt 178 graphically and/or textually indicates a corrective action for the pilot, copilot and/or autopilot control module 28 to result in a convergence of the vehicle 10 to the selected flight plan. The action indicator 177 textually indicates the result of the corrective action for the pilot and/or copilot, and the action indicator 177' indicates the resultant path of the vehicle 10. In this example, the action indicator 177' comprises a second dash line, however, the action indicator 177' can comprise a highlighted section (e.g. a rectangular box), a line with a different thickness, etc. As the convergence determination module 106 determines the convergence leg data 160, the divergence leg data 162, the revision data 164, the end point data 166 and the speed data 168 for the current and future state of the vehicle 10 along the selected flight plan, the converging indicator 174, the prompt 178, the action indicator 177, the action indicator 177' and the diverging indicator 176 are displayed for each leg of the selected flight plan, as appropriate, to provide the pilot and/or co-pilot with situational awareness of the current and future movement of the vehicle 10. It should be noted that the user interface 172 can also include other indicators, such as one or more triangles that graphically indicate one or more waypoints, and the one or more waypoints can be determined from the flight plan leg data 114.

Figure 7:
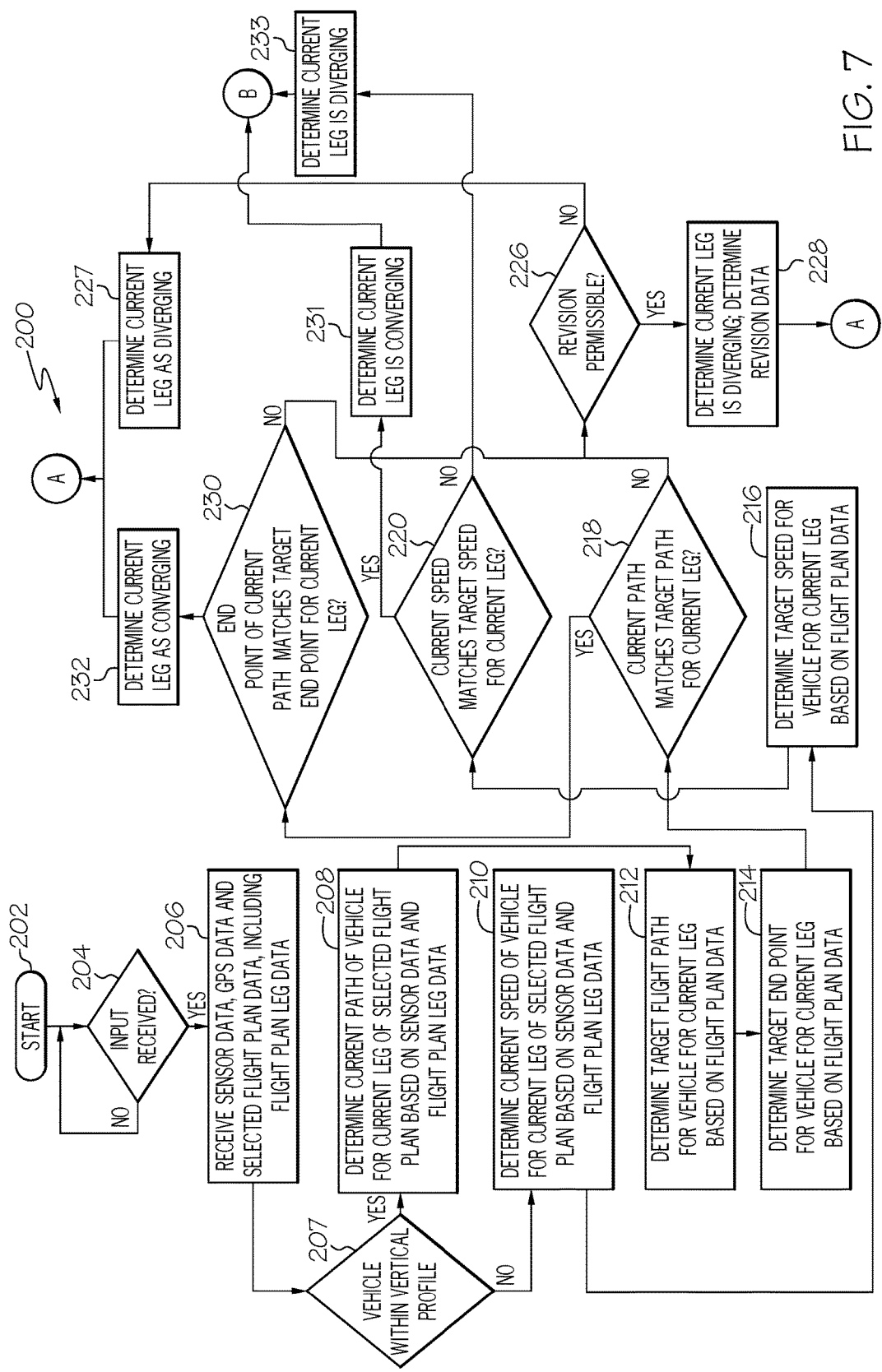
FIG. 7 is a flowchart illustrating a control method of the system of FIG. 1 in accordance with various embodiments.
Figure 8:
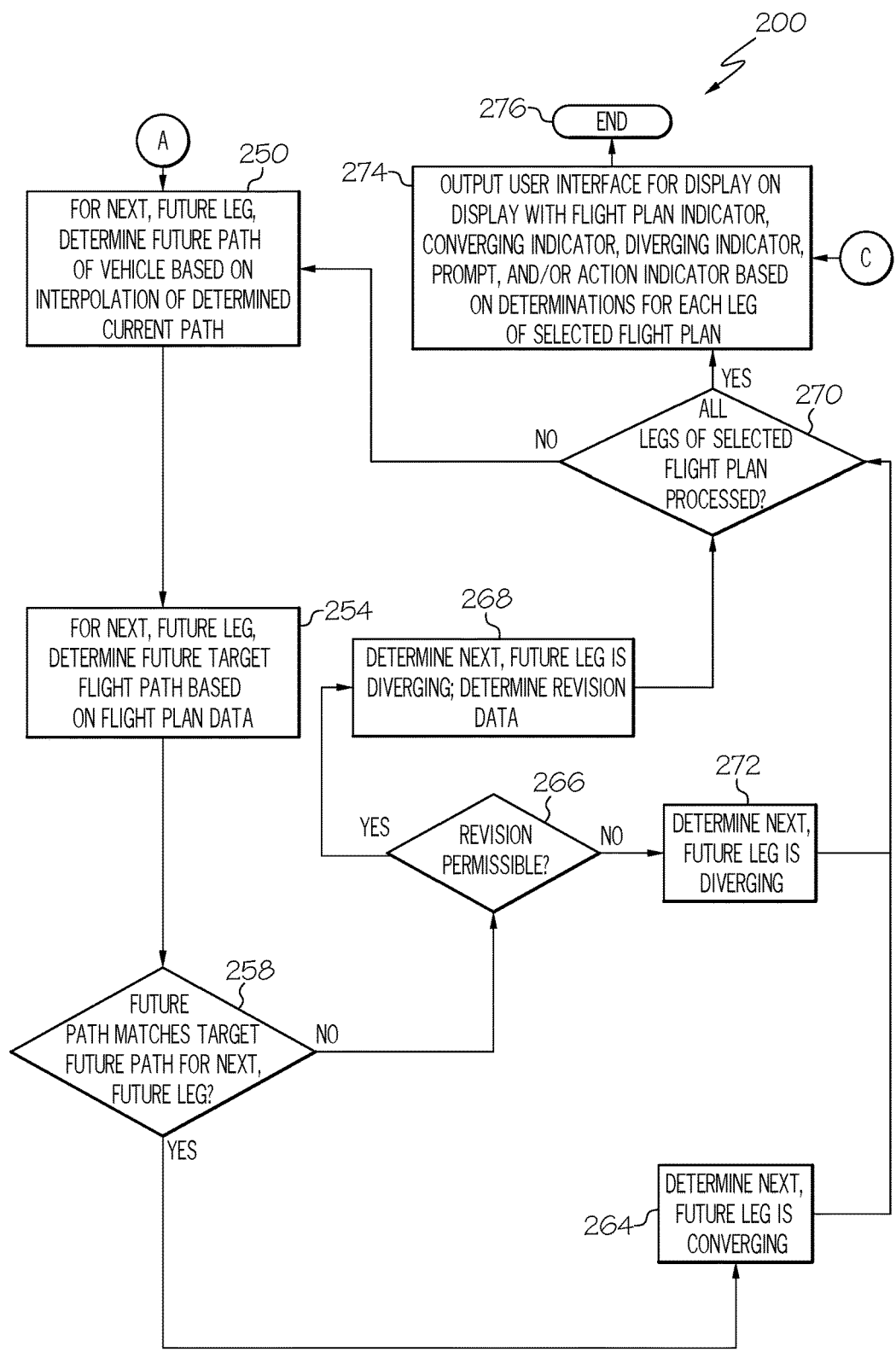
FIG. 8 is a continuation of the flowchart of FIG. 7.
Figure 9:
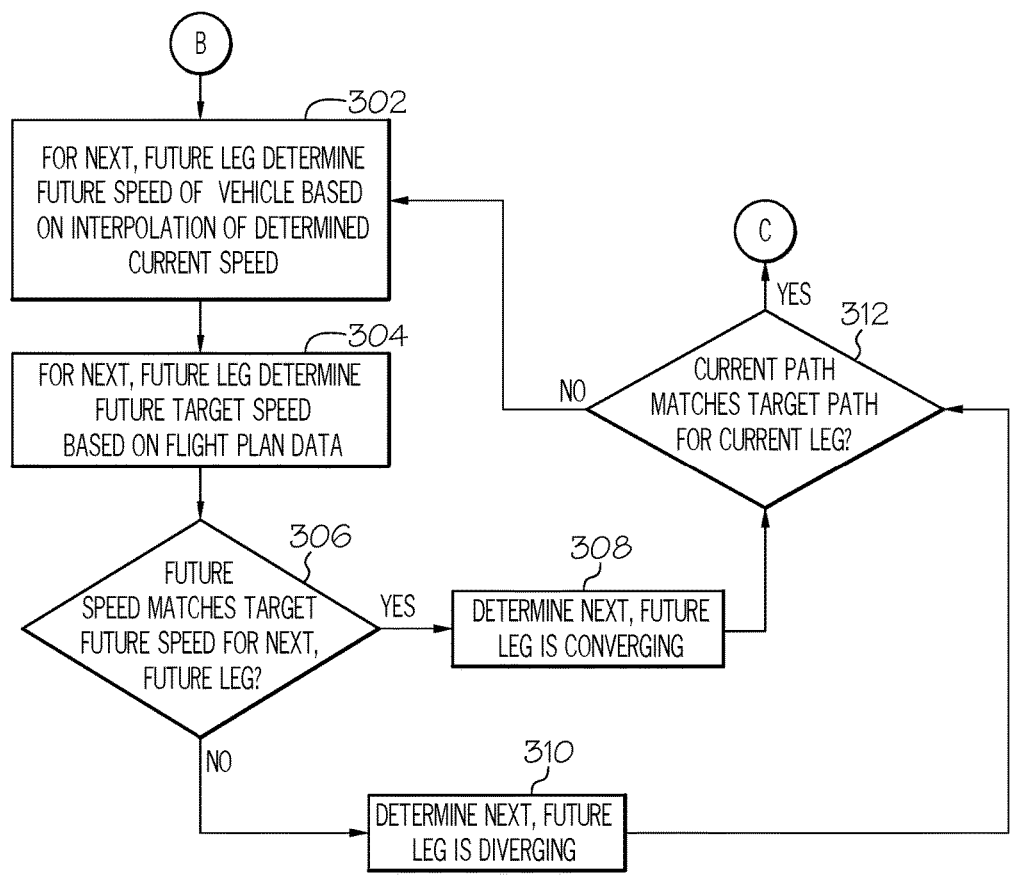
FIG. 9 is a continuation of the flowchart of FIG. 7.

Referring now to FIGS. 7-9, and with continued reference to FIGS. 1-6, a flowchart illustrates a control method that can be performed by the vehicle state display control module 20 of FIGS. 1-2 in accordance with the present disclosure. As can be appreciated in light of the disclosure, the order of operation within the method is not limited to the sequential execution as illustrated in FIGS. 7 and 8, but may be performed in one or more varying orders as applicable and in accordance with the present disclosure.

In various embodiments, the method can be scheduled to run periodically or based on predetermined events, such as based on the receipt of input data 170 or upon a start-up of the vehicle 10.

With reference to FIG. 7, a method 200 for displaying current and future states of a vehicle 10 is shown. The method begins at 202. In various embodiments, block 204 is optional. Optionally at 204, the method determines whether input has been received via the input device 32, which comprises the input command for the autopilot control module 28. If input has been received, the method proceeds to 206. Otherwise, the method loops. Alternatively, the method proceeds directly to 206, and thus, input from the input device 32 is not required for the method to generate current and future states of the vehicle 10 for display on the display 34.

At 206, the method receives the sensor data 116; the GPS data 112; the flight plan data 136 and the flight plan leg data 114 from the flight plan datastore 30 for the selected flight plan, via the flight control module 24, for example. At 207, the method determines whether the altitude of the vehicle 10 is within about 250 feet (ft) of the vertical profile associated with the current leg of the flight plan based on the GPS data 112, the flight plan leg data 114 and the altitude data 118. If true, the method proceeds to 208. Otherwise, the method proceeds to 210.

At 208, the method determines the current path or pitch of the vehicle 10 for the current leg based on the sensor data 116 and the flight plan leg data 114 (e.g. computes the current path leg data 128 from equation (1)). At 212, the method determines the target flight path or pitch of the vehicle 10 for the current leg of the selected flight plan based on the flight plan data 136 (e.g. computes the target leg pitch data 148 based on equation (3)). At 214, the method determines the target end point for the vehicle 10 for the current leg based on the flight plan data 136 (e.g. target leg end data 150).

At 218, the method determines whether the current path of the vehicle 10 (e.g. the current path leg data 128) matches the target path for the current leg of the selected flight plan (e.g. target leg pitch data 148). If the current path leg data 128 matches the target leg pitch data 148, the method proceeds to 230. Otherwise, at 226, the method determines whether a revision of the current flight path of the vehicle 10 to converge to the target path is permissible, based on the threshold data 158. If the revision is permissible, at 228, the method determines the current leg is diverging (e.g. determines divergence leg data 162 for the current leg) and determines the revision data 164. The method proceeds to A on FIG. 8. Otherwise, if revision is not permissible, at 227, the method determines the current leg is diverging (e.g. determines divergence leg data 162 for the current leg) and proceeds to A on FIG. 8.

At 230, the method determines whether the end point of the current path of the vehicle 10 from the current path leg data 128 matches the target leg end point of the target path (e.g. target leg end data 150) for the current leg of the selected flight plan. If the end point matches the target leg end point, the method proceeds to 232. At 232, the method determines the current leg is converging, on path or in synch with the target profile determined from the flight plan data 136 and the flight plan leg data 114, and proceeds to A on FIG. 8. Otherwise, the method proceeds to 226.

At 210, the method determines the current speed of the vehicle 10 for the current leg of the selected flight path based on the sensor data 116 and the flight plan leg data 114 (e.g. the current leg speed data 132). At 216, the method determines the target speed for the vehicle 10 for the current leg based on the flight plan data 136 (e.g. target speed data 154). At 220, the method determines whether the current speed of the vehicle 10 (e.g. the current leg speed data 132 computed from equation (2)) matches the target speed (e.g. the target speed data 154) for the current leg of the selected flight plan. If the current leg speed data 132 matches the target speed data 154, the method proceeds to 231. Otherwise, the method proceeds to 233.

At 231, the method determines the current leg is converging and proceeds to B on FIG. 9. At 233, the method determines the current leg is diverging and proceeds to B on FIG. 9.

With reference to FIG. 8, and continued reference to FIGS. 1-6, from A, at 250, the method determines, for the next, future leg (based on the flight plan leg data 114), the future path of the vehicle 10 based on the interpolation of the determined current path (e.g. computes the future path leg data 130). At 254, the method determines, for the next, future leg, the future target flight path (e.g. computes the future target data 152) based on the flight plan data 136 for the next, future leg of the selected flight path.

At 258, the method determines whether the future path (e.g. the future path leg data 130) of the vehicle 10 matches the target future path (e.g. the future target data 152) for the vehicle 10 for the next, future leg. If true, the method proceeds to 264. Otherwise, at 266, the method determines whether a revision of the future flight path of the vehicle 10 to converge to the target future path (e.g. future target data 152) is permissible, based on the threshold data 158. If the revision is permissible, at 268, the method determines the next, future leg is diverging (e.g. determines divergence leg data 162 for the next, future leg) and determines the revision data 164. The method proceeds to 270. Otherwise, if revision is not permissible, at 272, the method determines the next, future leg is diverging (e.g. determines divergence leg data 162 for the next, future leg) and proceeds to 270.

At 270, the method determines whether all legs of the selected flight plan have been processed or determined as converging or diverging, based on the flight plan leg data 114. If true, the method proceeds to 274. Otherwise, the method loops to 250.

At 274, the method generates and outputs the user interface 172 for display on the display 34, which includes the flight plan indicator 173, the position icon 179, and one or more of the converging indicator 174, the diverging indicator 176, the prompt 178 and the action indicator 177 based on the determinations for each of the legs of the selected flight plan. The method ends at 276.

With reference to FIG. 9, and continued reference to FIGS. 1-6, from B, at 302, the method determines for the next, future leg, the future speed of the vehicle 10 based on the interpolation of the determined current state or speed of the vehicle 10 (e.g. computes the future leg speed data 134 recursively by interpolating the computed DELTA $THETA_{TRACK\ SPEED\ ELEVATOR}$). At 304, the method determines for the next, future leg, the future target speed (e.g. computes the target speed data 154 for the next, future leg) based on the flight plan data 136 for the next, future leg of the selected flight path.

At 306, the method determines whether the future speed (e.g. the future leg speed data 134, computed recursively by interpolating the computed DELTA $THETA_{TRACK\ SPEED\ ELEVATOR}$) matches the target speed (e.g. the target speed data 154 computed from equation (4)) for the next, future leg of the selected flight path. If the future leg speed data 134 matches the target speed data 154, the method proceeds to 308. At 308, the method determines the next, future leg is converging (e.g. determines convergence leg data 160 for the next, future leg). Otherwise, the method proceeds to 310.

At 312, the method determines whether all legs of the selected flight plan have been processed or determined as converging or diverging, based on the flight plan leg data 114. If true, the method proceeds to C on FIG. 8. Otherwise, the method loops to 302.

At 310, the method determines the next, future leg is diverging (e.g. determines divergence leg data 162 for the next, future leg) and proceeds to 312.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for displaying a current state and a future state of a vehicle on a display associated with the vehicle, the method comprising:
   receiving, by a processor, flight plan data for a selected flight plan and a plurality of legs associated with the selected flight plan from a source of flight plan data;
   determining, by the processor, a current state of the vehicle with respect to the one of the plurality of legs of the selected flight plan based on sensor data generated by one or more sensors associated with the vehicle, the current state of the vehicle comprising a current pitch of the vehicle;
   determining, by the processor, a current target state for the vehicle with respect to one of the plurality of legs of the selected flight plan based on the flight plan data, the current target state comprising a target pitch of the vehicle;
   determining, by the processor, a divergence of the current state based on a difference between the current state and the current target state;
   determining, by the processor, at least one corrective action based on the determining the divergence;
   determining, by the processor, a future state of the vehicle with respect to a second one of the plurality of legs of the selected flight plan based on the determined current state;

determining, by the processor, a future target state for the vehicle with respect to the second one of the plurality of legs based on the flight plan data;

determining, by the processor, a convergence of the future state based on the future state matching the future target state for the second one of the plurality of flight legs; and generating, by the processor, a user interface for display on the display that includes:
- a flight plan indicator that graphically illustrates each of the plurality of legs of the selected flight plan;
- a divergence indicator that graphically illustrates the divergence of the current state with respect to the one of the plurality of legs of the selected flight plan, the divergence indicator positioned offset from a portion of the flight plan indicator associated with the one of the plurality of legs of the selected flight plan;
- a prompt on the user interface for the at least one corrective action;
- an action indicator that indicates a resultant path of the vehicle based on the execution of the at least one corrective action in the prompt, the action indicator graphically illustrates a convergence of the current state with respect to the one of the plurality of legs of the selected flight plan; and
- a convergence indicator that graphically indicates the convergence of the future state to the second one of the plurality of flight legs superimposed over a portion of the flight plan indicator associated with the second one of the plurality of flight legs; and displaying the generated user interface on the display.

2. The method of claim 1, further comprising:
determining a convergence of the current state with the current target state based on the current state matching the current target state; and
outputting the user interface for display on the display that includes the convergence indicator that graphically indicates the convergence of the current state with respect to the one of the plurality of legs of the selected flight plan.

3. The method of claim 1, further comprising:
determining, by the processor, whether a revision to the current state is permissible based on one or more thresholds; and
outputting the prompt based on the determining of the revision.

4. The method of claim 1, further comprising determining, by the processor, whether an altitude of the vehicle is within a vertical profile associated with one of the plurality of legs of the selected flight plan based on the sensor data, the determining, by the processor, the current state of the vehicle is based on the determining that the altitude of the vehicle is within the vertical profile, and, based on the determining that the altitude of the vehicle is outside of the vertical profile, the method further comprises:
determining a current speed of the vehicle based on the sensor data.

5. A system that displays a current state and a future state of a vehicle on a display associated with the vehicle, the system comprising:
- a source of a flight plan data for a selected flight plan and a plurality of legs associated with the selected flight plan;
- a control module having a processor that:
  - determines whether an altitude of the vehicle is within a vertical profile associated with one of the plurality of legs of the selected flight plan based on sensor data generated by one or more sensors associated with the vehicle;
  - based on a determination that the altitude of the vehicle is within the vertical profile, determines a current state of the vehicle with respect to one of the plurality of legs of the selected flight plan based on the sensor data, the current state of the vehicle comprising a current pitch of the vehicle;
  - determines a current target state for the vehicle with respect to one of the plurality of legs of the selected flight plan based on the flight plan data, the current target state comprising a target pitch of the vehicle;
  - determines a divergence of the current state based on a difference between the current state and the current target state;
  - determines at least one corrective action based on the determination of the divergence;
  - generates a user interface for display on the display that includes:
    - a flight plan indicator that graphically illustrates each of the plurality of legs of the selected flight plan;
    - a divergence indicator that graphically illustrates the divergence of the current state with respect to the one of the plurality of legs of the selected flight plan, the divergence indicator positioned offset from a portion of the flight plan indicator associated with the one of the plurality of legs of the selected flight plan;
    - a prompt on the user interface for the at least one corrective action; and
    - an action indicator that indicates a resultant path of the vehicle based on the execution of the at least one corrective action in the prompt, the action indicator graphically illustrates a convergence of the current state with respect to the one of the plurality of legs of the selected flight plan; and
- a display that displays the generated user interface,
wherein based on a determination that the altitude of the vehicle is outside of the vertical profile, the processor of the control module determines a current speed of the vehicle with respect to the one of the plurality of legs of the selected flight plan based on the sensor data, a target speed for the vehicle with respect to the one of the plurality of legs of the selected flight plan based on the flight plan data and determines a divergence of the current speed based on a difference between the current speed and the target speed.

6. The system of claim 5, wherein the processor of the control module determines a future state of the vehicle with respect to a second one of the plurality of legs of the selected flight plan based on the determined current state, and determines a future target state for the vehicle with respect to the second one of the plurality of legs based on the flight plan data.

7. The system of claim 6, wherein the processor of the control module determines one of a convergence of the future state based on the future state matching the future target state or a divergence of the future state based on a difference between the future state and the future target state.

8. The system of claim 7, wherein the processor of the control module outputs a convergence indicator or the divergence indicator on the user interface for display on the display that graphically illustrates the convergence or divergence, respectively, of the future state.

9. The system of claim 8, wherein the convergence of the future state is superimposed on a portion of the flight plan indicator associated with the second one of the plurality of legs.

10. The system of claim 5, wherein the processor of the control module determines a convergence of the current state based on the current state matching the current target state, and outputs the user interface for display on the display with a convergence indicator that graphically illustrates the convergence of the current state with respect to the one of the plurality of legs of the selected flight plan.

11. A method for displaying a current state and a future state of a vehicle on a display associated with the vehicle, the method comprising:
    receiving flight plan data for an approach to landing flight plan and a plurality of legs associated with the approach to landing flight plan from a source of flight plan data, the plurality of legs including a current leg and a plurality of future legs;
    determining, by a processor, a current path of the vehicle with respect to the current leg based on sensor data generated by one or more sensors associated with the vehicle;
    determining, by the processor, a current target path for the vehicle with respect to the current leg based on the flight plan data;
    determining, by the processor, a future path of the vehicle with respect to one of the plurality of future legs based on the determined current path;
    determining, by the processor, a future target path for the vehicle with respect to the one of the plurality of future legs based on the flight plan data;
    determining, by the processor, a divergence of the current path based on a difference between the current path and the current target path;
    determining, by the processor, at least one corrective action based on the determining of the divergence;
    determining, by the processor, one of a convergence of the future path based on the future path matching the future target path or a divergence of the future path based on a difference between the future path and the future target path;
    repeating the determining, by the processor, of the future target path for the vehicle with respect to each remaining one of the plurality of future legs and repeating the determining, by the processor, the future target path for the vehicle with respect to each remaining one of the plurality of future legs until each future leg of the plurality of future legs has been determined to have the convergence or the divergence;
    generating, by the processor, a user interface for display on the display that includes:
        a flight plan indicator that graphically indicates the plurality of legs of the approach to landing flight plan;
        a divergence indicator that graphically indicates the divergence of the current path positioned offset from a portion of the flight plan indicator associated with the current leg;
        a convergence indicator that graphically indicates the convergence of the future path to the plurality of future legs superimposed over a portion of the flight plan indicator associated with the one of the plurality of future legs based on the determining of the convergence, or the divergence indicator that graphically indicates the divergence of the future path positioned offset from a portion of the flight plan indicator associated with the one of the plurality of future legs based on the determining of the divergence;
        a prompt on the user interface for the at least one corrective action; and
        an action indicator that indicates a resultant path of the vehicle based on the execution of the at least one corrective action in the prompt, the action indicator graphically illustrates a convergence of the current state with respect to the current leg; and
    displaying the generated user interface on the display.

12. The method of claim 11, further comprising determining, by the processor, the divergence of the current path based on receipt of an input to activate an autopilot system.

13. The method of claim 11, further comprising determining, by the processor, whether an altitude of the vehicle is within a vertical profile associated with one of the plurality of legs of the approach to landing flight plan based on the sensor data, the determining the current path of the vehicle is based on the determining the altitude of the vehicle is within the vertical profile, and based on a determination that the altitude of the vehicle is outside of the vertical profile, the method comprises:
    determining, by the processor, a current speed of the vehicle with respect to the one of the plurality of legs of the selected flight plan based on the sensor data, a target speed for the vehicle with respect to the one of the plurality of legs of the selected flight plan based on the flight plan data; and
    determining a divergence of the current speed based on a difference between the current speed and the target speed.

* * * * *